US009457392B2

(12) United States Patent
Sheu et al.

(10) Patent No.: US 9,457,392 B2
(45) Date of Patent: Oct. 4, 2016

(54) APPARATUS AND METHOD FOR IMPARTING SELECTED TOPOGRAPHIES TO ALUMINUM SHEET METAL AND APPLICATION THERE FOR

(71) Applicant: Alcoa Inc., Pittsburgh, PA (US)

(72) Inventors: Shen Sheu, Murrysville, PA (US); Julie A. Wise, Natrona Heights, PA (US); Tom J. Kasun, Export, PA (US); Neville C. Whittle, Irwin, PA (US); June M. Epp, Pittsburgh, PA (US); David E. Coleman, Murrysville, PA (US); Norman J. Panseri, Irwin, PA (US); Salvador A. Marcilla Gomis, Alicante (ES); Patricia A. Stewart, Pittsburgh, PA (US); Antonio Armigliato, Villorba (IT); Marco Iovane, Mestre (IT)

(73) Assignee: Alcoa Inc., Pittsburgh, PA (US)

(*) Notice: Subject to any disclaimer, the term of this patent is extended or adjusted under 35 U.S.C. 154(b) by 368 days.

(21) Appl. No.: 14/075,463

(22) Filed: Nov. 8, 2013

(65) Prior Publication Data
US 2014/0060700 A1 Mar. 6, 2014

Related U.S. Application Data

(63) Continuation-in-part of application No. 13/892,028, filed on May 10, 2013.

(51) Int. Cl.
*B21D 53/00* (2006.01)
*B65G 11/06* (2006.01)
(Continued)

(52) U.S. Cl.
CPC ............. *B21D 53/00* (2013.01); *B21B 27/005* (2013.01); *B24C 1/06* (2013.01); *B24C 1/10* (2013.01);
(Continued)

(58) Field of Classification Search
CPC .......... B21D 53/00; B24C 1/06; B24C 1/10; B21B 27/005; B21B 2003/001; B65G 11/066; F16L 9/02; B67C 11/00; E04B 1/32
USPC ................................................ 72/53; 29/90.7
See application file for complete search history.

(56) References Cited

U.S. PATENT DOCUMENTS 2,361,039 A 10/1944 Langel
2,986,193 A 5/1961 Howell
(Continued)

FOREIGN PATENT DOCUMENTS

EP 0279773 A3 8/1990
EP 1344580 A1 9/2003
(Continued)

OTHER PUBLICATIONS

International Search Report and Written Opinion in connection with International Patent Application No. PCT/US2012/064460 "Apparatus and Method for Imparting Selected Topographies to Aluminum Sheet Metal" dated Mar. 22, 2013 (11 pgs).
(Continued)

*Primary Examiner* — David B Jones
(74) *Attorney, Agent, or Firm* — Greenberg Traurig, LLP

(57) ABSTRACT

A material handler formed from isotropic textured aluminum sheet rolled by rolls indented with spherical media, such as steel ball bearings, producing a sheet with a low coefficient of friction relative to particulate matter like flour. The slippery sheeting may be used to make tanks, silos, conduits and guides to facilitate storage and flow of the particulate matter.

10 Claims, 18 Drawing Sheets

(51) Int. Cl.
*F16L 9/02* (2006.01)
*B67C 11/00* (2006.01)
*E04B 1/32* (2006.01)
*B21B 27/00* (2006.01)
*B24C 1/06* (2006.01)
*B24C 1/10* (2006.01)
*B21B 3/00* (2006.01)

(52) U.S. Cl.
CPC ............ *B65G 11/066* (2013.01); *B67C 11/00* (2013.01); *E04B 1/32* (2013.01); *F16L 9/02* (2013.01); *B21B 2003/001* (2013.01)

(56) References Cited

U.S. PATENT DOCUMENTS

| | | | |
|---|---|---|---|
| 3,824,827 | A | 7/1974 | Stockbridge |
| 4,432,220 | A | 2/1984 | Loersch et al. |
| 4,454,740 | A | 6/1984 | Neal et al. |
| 5,354,581 | A | 10/1994 | Laube |
| 5,409,415 | A | 4/1995 | Kawanami et al. |
| 5,447,404 | A | 9/1995 | Bjelkeby |
| 5,537,851 | A | 7/1996 | Sheu et al. |
| 5,596,912 | A | 1/1997 | Laurence et al. |
| 6,290,632 | B1 | 9/2001 | Blake et al. |
| 7,094,502 | B2 | 8/2006 | Schaefer et al. |
| 2007/0137037 | A1 | 6/2007 | Noble et al. |
| 2010/0034993 | A1 | 2/2010 | Spoto et al. |
| 2010/0239398 | A1 | 9/2010 | Brey |
| 2013/0122327 | A1 | 5/2013 | Sheu et al. |
| 2013/0273394 | A1 | 10/2013 | Sheu et al. |
| 2014/0060700 | A1* | 3/2014 | Sheu ............... B21B 27/005 141/331 |

FOREIGN PATENT DOCUMENTS

| | | |
|---|---|---|
| JP | 2000288601 A1 | 10/2000 |
| WO | 9507774 A1 | 3/1995 |
| WO | 0166276 A1 | 9/2001 |
| WO | 2013071114 A1 | 5/2013 |
| WO | 2014074160 A1 | 5/2014 |
| WO | 2014074844 A1 | 5/2014 |

OTHER PUBLICATIONS http://engineering.myindialist.com/wp-content/uploads/2009/10/clip_image0028.gif.
http://www.jsm.or.jp/ejamVol.2.No.2/GA/13/EJAM2-2GA13-Fig.6_Ultrasonic_Shot_Peening_USP_for_Steam_Generator.png.
PCT International Search Report and Written Opinion of the International Searching Authority, Aug. 23, 2013, PCT/US2013/040599, International Filing Date May 10, 2013.
Pawelski, O. et al., Einfluss Unterschiedlicher Arbeitswalzen-Aufrauhverfahren Auf Die Oberflaechenfeinstruktur Beim Nachwalzen Von Karosserieblechen, Stahl und Eisen, Verlag Stahleisen, Dusseldorf, DE, vol. 114, No. 6, Jun. 13, 1994, pp. 183-188 including first page of English translation.
Benedict, E.M. Roll Knurling at South Works of U.S. Steel, Iron and Steel Engineer, vol. 32, No. 4, Apr. 1, 1955.
PCT International Search Report, May 15, 2014, PCT/US2013/069188, International Filing Date May 10, 2013.
Notificaton of Transmital of the International Search Report and Written Opinion of PCT/US2013/069188 dated Apr. 4, 2014.
U.S. Appl. No. 13/673,468, filed Nov. 9, 2012, Shen Sheu Office Action Issued Apr. 8, 2015.
International Preliminary Report on Patentability and Written Opinion of the International Searching Authority mailed May 12, 2015 in connection with International Application No. PCT/US2013/040599.
International Preliminary Report on Patentability and Written Opinion of the International Searching Authority mailed May 21, 2015 in connection with International Application No. PCT/US2013/069188.

* cited by examiner

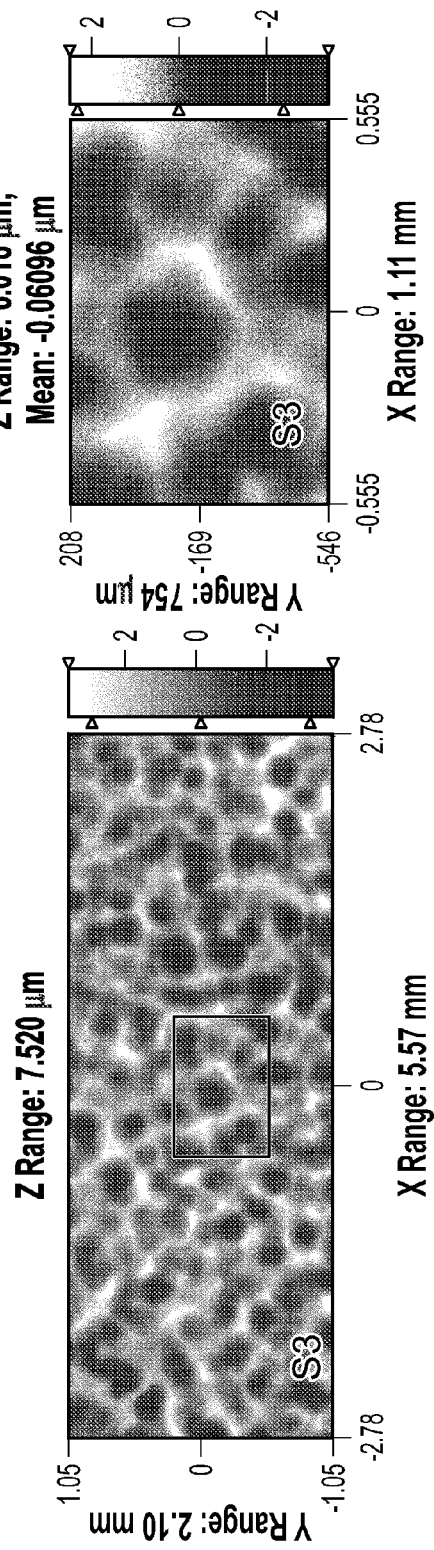
FIG. 3B
FIG. 3A
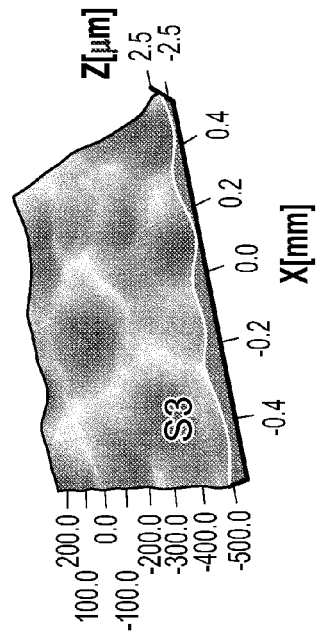
FIG. 3D
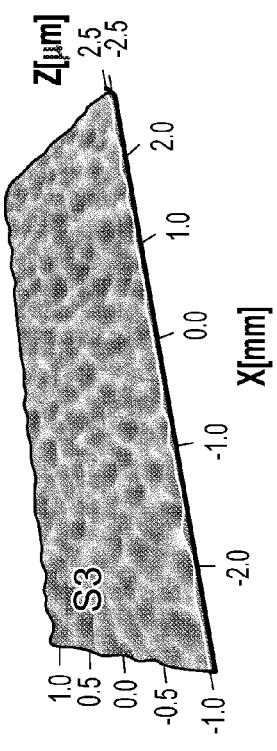
FIG. 3C

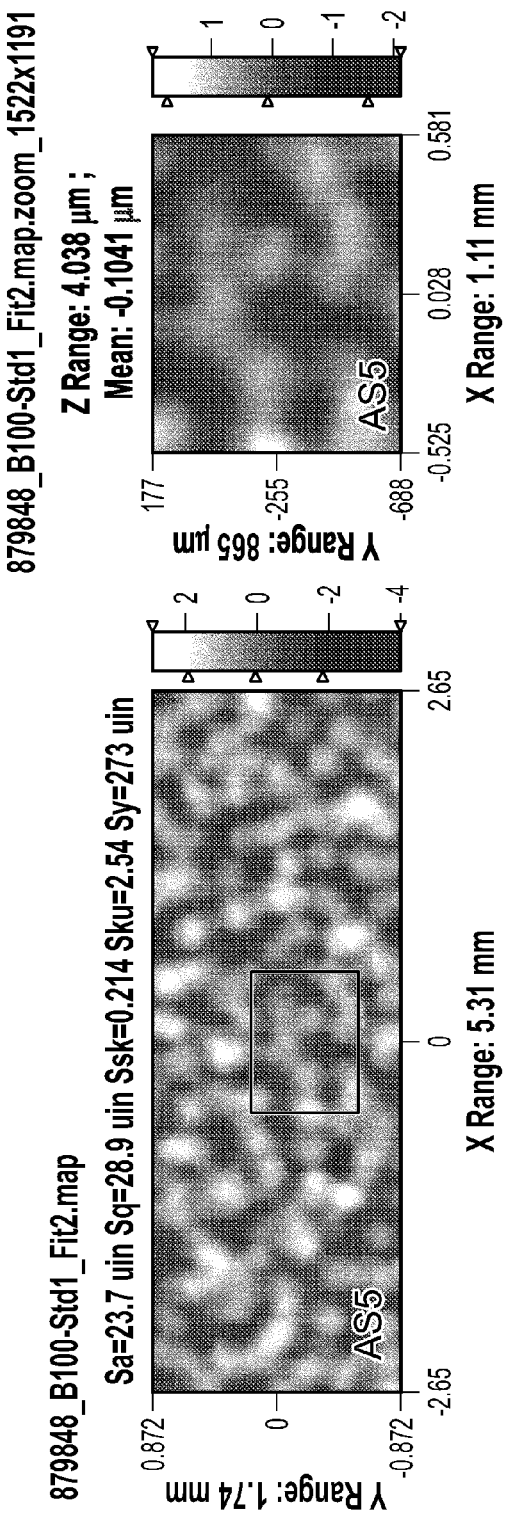
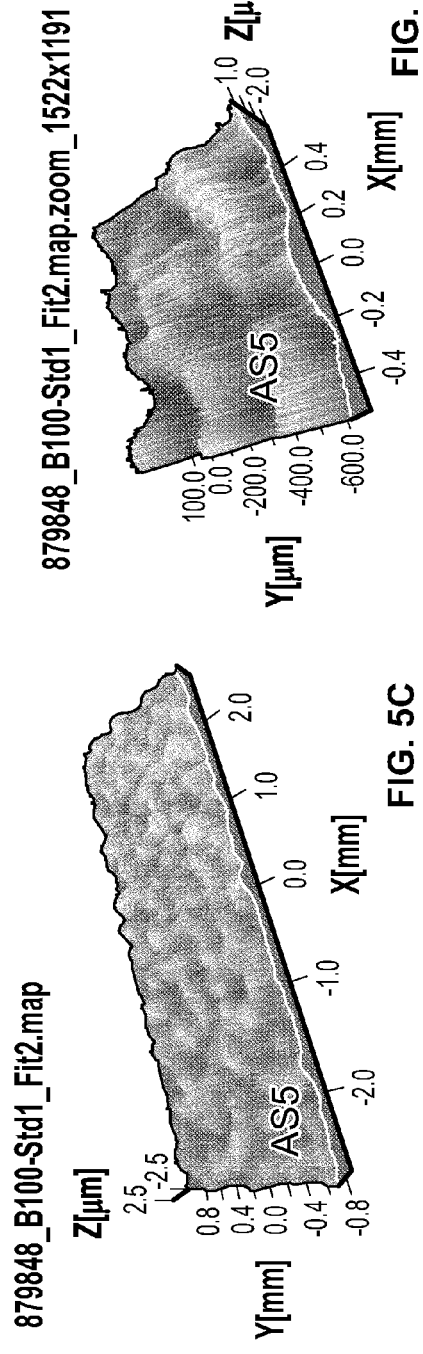
FIG. 5A
FIG. 5B
FIG. 5C
FIG. 5D

APPARATUS AND METHOD FOR IMPARTING SELECTED TOPOGRAPHIES TO ALUMINUM SHEET METAL AND APPLICATION THERE FOR

CROSS REFERENCE TO RELATED APPLICATIONS

The present application is a continuation in part application of U.S. application Ser. No. 13/892,028, entitled Apparatus and Method for Imparting Selected Topographies to Aluminum Sheet Metal, filed May 10, 2013, the disclosure of which is incorporated by reference herein in its entirety for all purposes. U.S. application Ser. No. 13/673,468, entitled Apparatus and Method for Imparting Selected Topographies to Aluminum Sheet Metal, filed Nov. 9, 2012, and U.S. Provisional Application No. 61/558,504 entitled, Apparatus and Method for Imparting Selected Topographies to Aluminum Sheet Metal, filed Nov. 11, 2011 are incorporated herein by reference in their entirety for all purposes.

FIELD

The present invention relates to rolled sheet metal and surfacing thereof, and more particularly, to methods and apparatus for producing specific surface textures having associated frictional and optical characteristics, such as an isotropic surface on aluminum sheet.

BACKGROUND

Currently, aluminum sheet producers often use a cold rolling mill to produce sheet of a desired thickness, width and surface. Skin/temper rolling mills may also be used with low reductions (<10%) to produce desired surfaces. The surface of the cylindrical rolls (work rolls) through which the sheet aluminum passes may be prepared for a rolling operation by grinding with an abrasive grinding wheel or belt. Grinding leaves the roll surface with directionality in appearance and frictional properties due to grinding marks (grain), which are then transferred/imparted to a sheet that is rolled by the ground work roll. The directional appearance of sheet rolled by ground work rolls is visible and frequently can be seen through painted coatings applied to the sheet material or to products made from the sheet material, such as an automobile body panel.

Embossing mills are also used to impart a given surface topography on sheet metal, e.g., to produce non-directional topographies. Processing sheet in an embossing mill is conducted after the rolling process and after the sheet has been reduced in thickness to target dimensions that approximate the final dimensions of the sheet. Embossing mills are intended to impart surface texture only, as opposed to having a substantial sizing effect on the sheet, and therefore operate on sheet that has already been rolled by the work rolls of a rolling mill. Embossing sheet in an embossing mill represents additional steps beyond rolling, requiring additional apparatus, material handling and managing a greater variety of roll types compared to normal rolling mills.

SUMMARY

The present disclosure relates to a method for making a material handler with at least one material contacting surface, including the steps of:

obtaining aluminum sheet that has been rolled by a work roll having a surface 50% to 100% covered by indentations lacking facets and having a depressed central area relative to a mean height of the surface and a raised, smooth peripheral lip having a greater height at an apex thereof than the mean height of the surface, the aluminum sheet having a static coefficient of friction with the at least one material of between 0.62 and 0.79; and forming the aluminum sheet into the at least one material contacting surface.

In another embodiment, the indentations have a diameter in the range of 150 µm to 400 µm and a depth relative to the apex of the peripheral lip in the range of 6±2.0 µm.

In another embodiment, the material handler is a silo with an interior space for storing the material and the material contacting surface forms at least a portion of a surface defining the interior space.

In another embodiment, the material contacting surface is formed into a funnel portion of the silo.

In another embodiment, the material handled by the silo is flour and further comprising the step of introducing the flour into the silo and contacting the material contacting surface with the flour.

In another embodiment, the material handled by the silo is sugar and further comprising the step of introducing the sugar into the silo and contacting the material contacting surface with the sugar.

In another embodiment, the material handler is a funnel with an interior space for converging the material toward an outlet and the material contacting surface forms at least a portion of a surface defining the interior space.

In another embodiment, the material handler is a trough with an interior space for guiding the material and the material contacting surface forms at least a portion of a surface defining the interior space.

In another embodiment, the material handler is a conduit with an interior space for guiding the material and the material contacting surface forms at least a portion of a surface defining the interior space.

In another embodiment, the aluminum sheet has a static coefficient of friction differing by no more than 5% between any two given orientations of the sheet relative to the direction that the coefficient is measured.

In another embodiment, a material handler with at least one material contacting surface, includes: a surface formed from aluminum sheet at least partially defining the material contacting surface, the aluminum sheet having been rolled by a work roll with a surface 60% to 100% covered by indentations lacking facets and having a depressed central area relative to a mean height of the surface and a raised, smooth peripheral lip having a greater height at an apex thereof than the mean height of the surface, the aluminum sheet having a coefficient of static friction of between 0.62 and 0.79.

In another embodiment, the indentations have a diameter in the range of 200 µm to 400 µm and a depth relative to the apex of the peripheral lip in the range of 0.5 µm to 2.0 µm.

In another embodiment, the material handler is a silo with an interior space for storing the material and the material contacting surface forms at least a portion of a surface defining the interior space.

In another embodiment, the material contacting surface is formed into a funnel portion of the silo.

In another embodiment, the material handler is a flour silo.

In another embodiment, the material handler is a sugar silo.

In another embodiment, the material handler is a funnel with an interior surface capable of converging the material toward an outlet and the material contacting surface forms at least a portion of a surface defining the interior surface.

In another embodiment, the material handler is a trough with a guiding surface capable of guiding the material and the material contacting surface forms at least a portion of the guiding surface.

In another embodiment, the material handler is a conduit with an interior guiding surface capable of guiding the material and the material contacting surface forms at least a portion of a surface defining the interior guiding surface.

In another embodiment, the aluminum sheet has a static coefficient of friction differing by no more than 5% between any two given orientations of the sheet relative to the direction that the coefficient is measured.

BRIEF DESCRIPTION OF THE DRAWINGS

For a more complete understanding of the present invention, reference is made to the following detailed description of exemplary embodiments considered in conjunction with the accompanying drawings.

FIG. 3a is a plan view graphical mapping of surface morphology of a sample surface of a working roll produced by a process in accordance with an embodiment of the present disclosure and as measured by optical profilometry. FIG. 3b is an enlarged view of a fragment of FIG. 3a, and FIGS. 3c and 3d are perspective graphical mappings of the surfaces shown in FIGS. 3a and 3b, respectively, as measured by optical profilometry.

FIG. 5a is a plan view graphical mapping of surface morphology of a sample of rolled aluminum sheet in accordance with an embodiment of the present disclosure and rolled by a working roll produced by a process in accordance with an embodiment of the present disclosure, as measured by optical profilometry. FIG. 5b is an enlarged view of a fragment of FIG. 5a, and FIGS. 5c and 5d are perspective graphical mappings of the surfaces shown in FIGS. 5a and 5b, respectively, as measured by optical profilometry.

DETAILED DESCRIPTION OF EXEMPLARY EMBODIMENTS

An aspect of the present disclosure is the recognition that for many applications of sheet metal, it is desirable to have a uniform, non-directional surface finish, i.e., a surface which appears isotropic and reflects light diffusely. Further, the present disclosure recognizes that in addition to appearance effects, the directionally oriented roughness of a sheet surface rolled by ground work rolls influences forming processes that may be used to form the sheet metal into a shaped product, such as an automobile panel, e.g., attributable to variations in frictional interaction between the forming tool and the sheet stock due to directionally oriented grain/grinding patterns in the surface of the metal sheet that were imparted by the work roll. The present disclosure also recognizes that a more isotropic surface is beneficial in conducting some forming processes that operate on aluminum sheet.

One method for producing a more isotropic surface on a work roll that is used to roll aluminum sheet metal (primarily for automotive sheet) is to surface the roll with an electric discharge texturing (EDT) machine. An EDT texturing head with multiple electrodes can be placed near the roll surface to generate an electric discharge/spark/arc from each electrode to the roll surface, locally melting the roll surface at each spark location and inducing the molten steel to form small pools of molten metal within associated craters. Operation of an EDT machine along the surface of a rotating roll produces an improved isotropic surface, but one which features numerous microscopic craters in the range of up to 100 μm in diameter and with rim heights of up to 15~20 μm (FIG. 1).

Applicants have recognized that the rims of the microscopic craters formed by the EDT process may be brittle, such that when the EDT textured rolls are used in a rolling mill, high contact pressure, e.g., up to 200 ksi, between the work roll, the sheet and/or the backup roll, can wear down the isotropic texture and produce debris, which is deposited on the sheet surface, on the mill and in the lubricant.

Figure 1A:
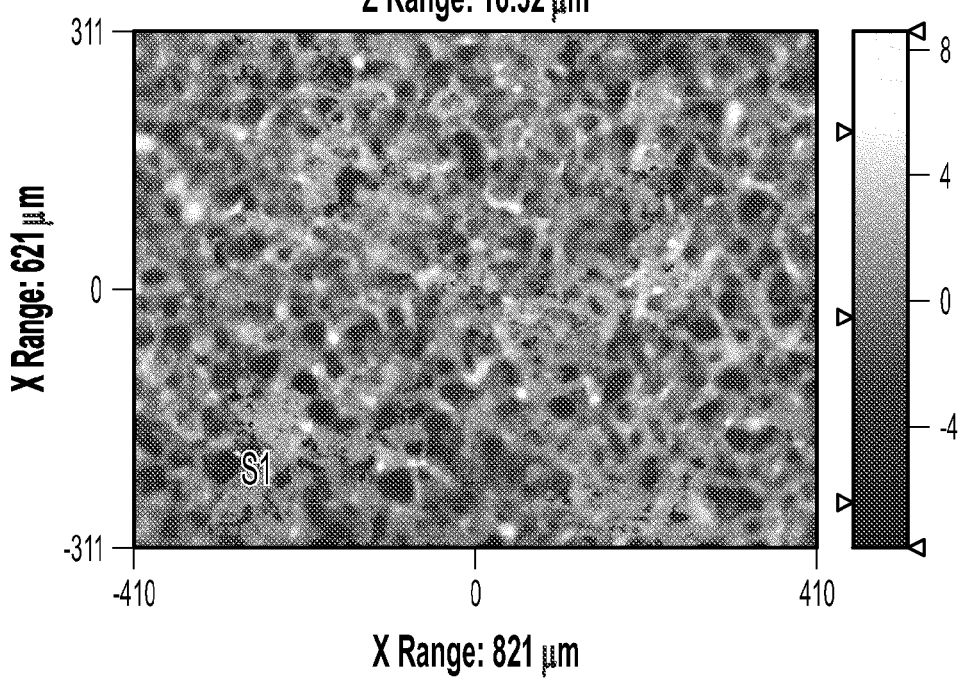
FIGS. 1a and 1b are a plan view and a perspective (3D) view graphical mappings, respectively, of surface morphology of a sample surface of a working roll produced by EDT texturing and as measured by optical profilometry.
Figure 1B:
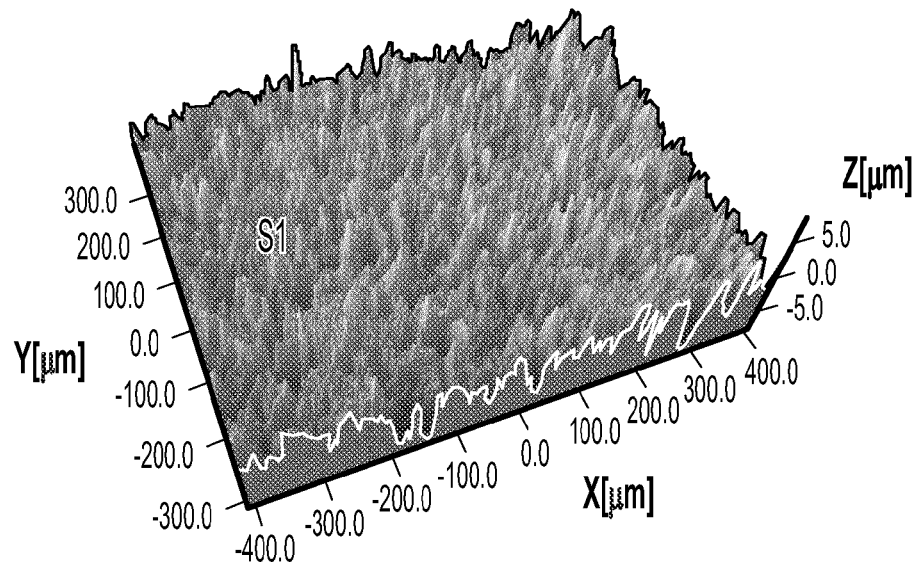

FIG. 1 shows a sample surface morphology of a surface S1 of an EDT treated working roll used for the rolling of aluminum sheet. As can be appreciated, the surface morphology could be characterized as covered with numerous sharp peaks and valleys 5.0 μm in magnitude relative to a reference plane.

Figure 2:
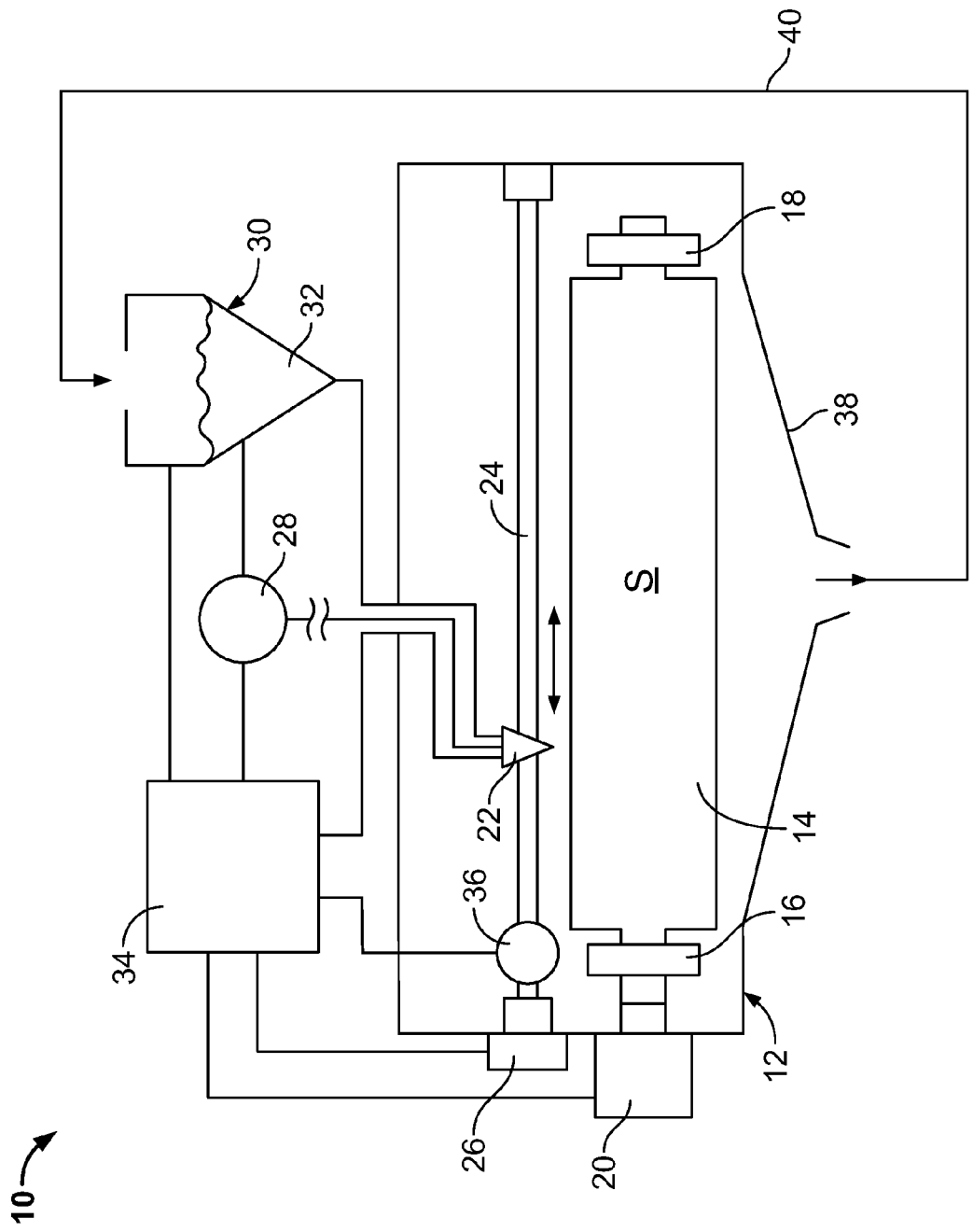
FIG. 2 is a diagrammatic view of an apparatus for surfacing a work roll in accordance with an embodiment of the present disclosure.

FIG. 2 shows a roll treating apparatus 10 having a cabinet 12 for containing a working roll 14. The working roll 14 may be supported on bearings 16, 18 to enable turning, e.g., by a motor 20 coupled to the working roll 14. The cabinet 12 also houses a shot/ball peening nozzle 22 which may be mounted on a gantry 24 that allows the nozzle 22 to be selectively moved and positioned, e.g., by the action of a motor 26 turning a screw drive or actuating a chain, rack, cable drive, or actuation via a motor-driven friction wheel drive associated with the nozzle 22. The nozzle 22 is fed by a compressor 28 and a media hopper 30. The nozzle 22 mixes compressed gas, e.g., air, from the compressor 28 and media 32 from the hopper 30, propelling and directing the media 30 against the outer surface S of the roll 14. The media may be in the form of steel, glass or ceramic balls, abrasive grit or other blasting/shot peening media, as described further below. A computer 34 may be used to programmatically control: the position of the nozzle 22 by controlling the motor 26, the rotation of the roll by controlling motor 20, the operation of the compressor 28 and the rate of dispensing media 32 from the hopper 30. A vision system 36 may be housed within the cabinet 12 to provide a view of the state of the surface S in order to ascertain whether a given target surface texture has been achieved through operation of the action of the roll treating apparatus 10. This vision system may be attached to the nozzle 22 or independently moveable on the gantry 24, may include magnification and a shield to protect input aperture and lens from impact from the media 32. Media 32 that has been projected through the nozzle 22 may be dispensed through a funnel portion 38 of the cabinet 12 to a recycling line 40 that returns the media 32 to the hopper 30, e.g., via a screw feed or a under the influence of compressed air, a blower or suction. The cabinet 12 may be provided with a door (not shown) and sight glass (not shown) to facilitate transfer of the roll 14 in and out of the cabinet 12 and to monitor the operation of roll treating apparatus 10. The nozzle 22 and compressor 28 may be of a commercial type to achieve the target peening intensities to create the desired surface topography.

Alternatively, the nozzle 22 may be hand-held, as in conventional shot-peening apparatus. The compressor 28 and the nozzle 22 may be changed to obtain the target peening intensity pressure output, i.e., either manually or under computer control, to regulate the velocity of media 32 projected from the nozzle 22 to accommodate different types of media 32, as well as to accommodate various operating conditions, such a roll 14 hardness, initial surface texture and the type of texture desired for surface S, e.g., attributable to the depth and circumference of dimples/craters made in the surface of the roll by a given media 32, such as steel balls/shot. The number of impacts and the dimensions of the impressions made by the media on the roll surface area relative to the total area can be described as, "% coverage" and can be adjusted by the compressor output setting, media flow rate and traverse speed of the nozzle 22 relative to the roll 14, as the nozzle 22 passes over the roll 14 and/or as the roll 14 is spun by motor 20. The control of the shot-peening process can be automatic or manual. For example, a person can manually hold, position and move the nozzle 22 and or the roll 14, as in traditional shot-peening operations wherein the person is equipped with protective gear and partially or fully enters into a cabinet containing the work piece. Visual or microscopic inspection of the roll may be conducted to verify suitable operation or to adjust the apparatus 10 and to verify an acceptably surfaced roll 14 at the completion of the peening/blasting operation.

As another alternative, the nozzle 22 may be contained within a portable, open-sided vessel (not shown) that presses against the surface S forming a moveable peening chamber that captures and redirects spent media back to a storage reservoir like hopper 30. This peening chamber may be positioned and moved manually or mechanically, such as, by a motor-driven feed mechanism like gantry 24 and optionally under the control of a computer 34.

The apparatus and methods of the present disclosure may be used to surface a working roll that imparts a given desired surface to sheet as it is rolled to size, e.g., to provide a sheet with an isotropically diffuse or bright appearance, eliminating the need to emboss or use a temper pass to create a textured sheet. In this context, "bright" refers to specular and "diffuse" refers to a non-specular appearance. The surface textures can be varied to achieve a given desired appearance and forming functionality associated with frictional properties by the appropriate choice of media and operating parameters.

In accordance with one aspect of the present disclosure, the desired texture is applied to a work roll surface, e.g. S, by a peening/blasting process that propels the selected media at the work roll surface S through a nozzle 22 by air pressure. The pressure, processing time per unit area, e.g., as a function of work roll 14 rotation speed and nozzle 22 traverse speed, nozzle 22 configuration and media 32 type are controlled to produce the desired work roll texture, which is effected by media 32 size, shape, density, hardness, velocity and resultant dimple/crater or indentation depth, width and shape and % coverage of dimples/craters on the treated surface area S. In accordance with some embodiments of the present disclosure, the media 32 chosen include spherical indenting media that produces smooth craters, such as high quality, precision steel ball bearings or shot, beads (glass, ceramic). Mixtures of beads and grit, such as aluminum oxide, silicon carbide or other grit types may be used depending upon the properties desired in the resultant surface.

FIGS. 3a-3d show graphical mappings of surface morphology as measured by optical profilometry of a work roll surface that has been surfaced in accordance with an embodiment of the present disclosure. The surface $S_3$ shown in FIGS. 3a-3d has been peened with steel ball bearings of grade 1000 with a diameter of ≤0.125" and a hardness of Rc≥60. Grade 1000 has 0.001" spherical and ±0.005" size tolerances. Better grades of ball bearings may also be used. The stand-off distance of the nozzle 22 from the roll 14 may be about 1 inch to about 12 inches, with a stand-off of about 5 inches being preferred for some applications. As can be appreciated, the use of ball bearings as peening media results in uniformly shaped craters on the work roll surface and the absence of the sharp, raised lips that are typical of EDT textures. More particularly, the use of spherical indenting media creates a plurality of smooth, central depressions mimicking the shape of the spheres/balls that make them, along with a smooth peripheral upwelling or lip around the depressions formed by the displacement of material from the depressions. Along the surface there is a gradual change in slope and abrupt ledges or discontinuities are minimized. In general, the depth of each depression at the center is below the mean or average height of the surface and apex of the peripheral lip is above the mean height. In order to make a smooth surface, the spherical indenting media must not be friable at the level of force required to create craters of appropriate depth. Otherwise, the spherical media will fracture and resultant sharp edges and flat facets on the broken media will cause the formation of facets on the surface of the work roll. These faceted impressions can occur on impact or later on when the spherical media is recycled and re-impacted against the surface. In addition to avoiding breakage of spherical media, it is beneficial if the force exerted by the media, considering the size, velocity and density of the spheres, does not create a trajectory upon impact that results in the formation of lateral furrows having a significant component of direction parallel to the surface of the work roll.

The generally smooth undulations in the surface $S_3$ of the work roll have a magnitude typically within the range of +/−3 to 6 μm, however, craters of any desired magnitude, e.g., in excess of 10 μm or less than 3 μm, may be achieved, as desired. As described more fully below, the smooth undulating surface produced by spherical indenting media, such as ball bearings may be produced in random patterns, e.g., as would be expected of a shot peening operation or in discrete patterns, as explained below. A typical EDT surface has a greater number of severe surface variations. A work roll shot-peened with ball bearings, as described above, can be used to produce bright sheet with an isotropic appearance, depending upon the starting background roll surface. While grade 1000 ball bearings were described above, other types of precision balls may be used, depending upon roll hardness, such as higher grade ball bearings. As noted, the spherical media selected for indenting the surface of the roll are preferably selected with material properties, such as, density, hardness, elasticity, compression strength and tensile strength that allow the balls to impact and indent a roll of a given hardness without breaking or developing facets due to the impact.

Figure 4A:
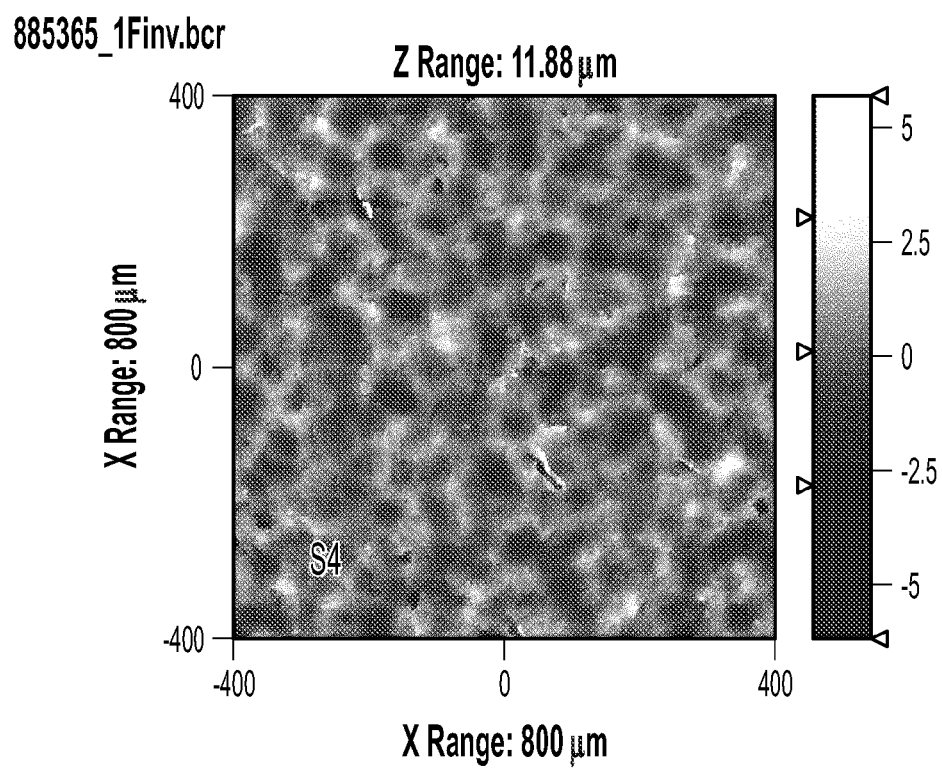
FIGS. 4a and 4b are plan view and perspective (3D) view graphical mappings, respectively, of surface morphology of a sample surface of a working roll produced by a process in accordance with an embodiment of the present disclosure, as measured by optical profilometry.
Figure 4B:
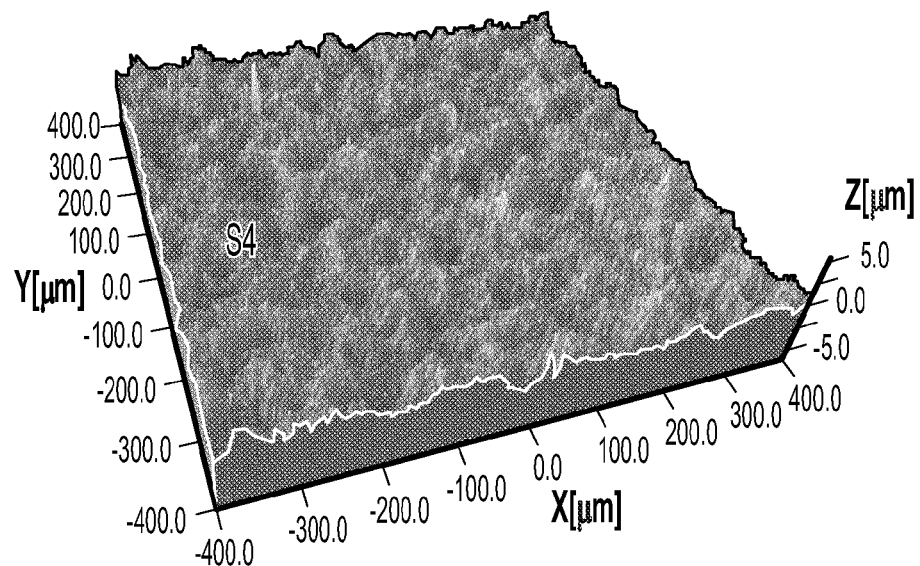

FIGS. 4a and 4b show a work roll surface $S_4$ produced in accordance with another embodiment of the present disclosure. More particularly, FIG. 4a is a plan view as measured by optical profilometry of the topology of a work roll surface that has been peened with aluminum oxide grit mixture (2:3 ratio of 120:180 grit) followed by glass beads of grade AC (60-120 mesh). The aluminum oxide grit blasting was carried out in a manner to remove the pre-grind roll pattern (as ascertained by visual evaluation), followed by blasting with the glass beads to achieve a desired diffuse surface appearance. FIG. 4b is a perspective (3D) graphical mapping of surface morphology of the surface $S_4$ shown in FIG. 4a, as measured by optical profilometry. As can be appreciated from FIGS. 4a and 4b, the use of glass beads results in a surface $S_4$ having fewer severe peaks than an EDT surface and the magnitude of surface variations is smaller than an EDT surface. FIG. 4b shows surface variations in the approximate range of +/−2.0 μm. Accordingly, one could fairly characterize the resultant surface $S_4$ as smoother than an EDT surface, but still having a micro-roughness which may be used to impart a diffuse isotropic surface appearance to an aluminum sheet that is rolled by a working roll having this type of surface.

In accordance with the present disclosure, surface treatment of a work roll by peening results in a surface which is less brittle than a work roll surface treated by the EDT process. As a result, the work roll surface (texture) lasts longer, can sustain higher surface loading pressures and creates less debris when used in rolling operations. In accordance with an embodiment of the present disclosure, where spherical media, such as ball bearings or glass beads, are used to surface the work roll, the gently undulating surface texture produced on the work roll provides advantages in the rolling process to produce an isotropic surface. Compared to normal, ground work rolls or EDT surfaced work rolls, the gentle undulations promote lower friction between the sheet and the working rolls, enabling higher reductions in sheet thickness to be conducted before lubricant or roll surface failure. The texture of a work roll surfaced in accordance with the present disclosure does not wear at the same rate as a typical ground work roll or an EDT surfaced roll. Experiments have shown that in a work roll-driven mill, the textures imparted to the roll by the methods of the present disclosure last 5 to 6 times longer than normally ground roll surfaces and that higher reductions are possible than those taken by EDT working rolls before exceeding mill horsepower limitations and experiencing lubricant failure. A roll surface morphology generated in accordance with an embodiment of the present disclosure can withstand greater than a 10% thickness reduction ratio to produce the desired textured sheet, e.g., up to 60%. This is in contrast to EDT surfaced working rolls which are typically operated in a range of about 8% to 10% reduction. Taking higher reductions can potentially allow elimination of an otherwise necessary pass(es) through the rolling mill to achieve the desired thickness.

FIG. 5a shows a sample surface $AS_5$ of a rolled aluminum sheet in accordance with the present disclosure and rolled by a working roll 14 with a roll surface, such as the roll surface $S_3$ illustrated in FIGS. 3a-3d, produced by a process in accordance with an embodiment of the present disclosure. FIG. 5b is enlarged view of the surface shown in FIG. 5a, both being rendered by optical profilometry. FIGS. 5c and 5d are perspective (3D) graphical mappings of the sample imaged in FIGS. 5a and 5b as measured by optical profilometry. The sheet produced as illustrated in FIGS. 5a-5d were produced by shot-peening with precision steel ball bearings. As illustrated and in general, the macro-texture, e.g., peened dimples/indentations, imparted to sheet metal by the working rolls during rolling is the inverse of the texture on the work roll. However, both macro and micro features affect the final level of surface brightness, i.e., the final level of specular reflection, of the sheet.

Figure 6A:
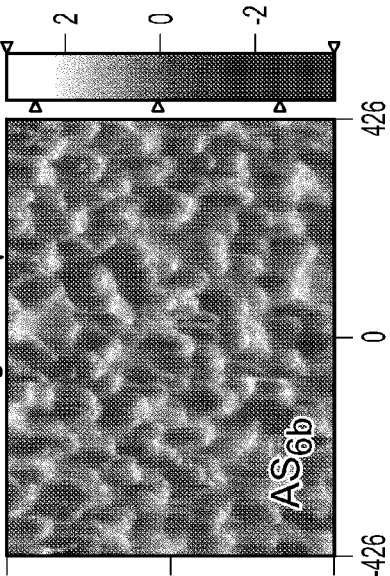
FIGS. 6a, 6b and 6c are plan view graphical mappings of surface morphology of three samples of rolled aluminum sheet in accordance with an embodiment of the present disclosure and rolled by a working roll produced by a process in accordance with an embodiment of the present disclosure at 10% reduction, 20% reduction and 40% reduction, respectively, as measured by optical profilometry.
Figure 6B:
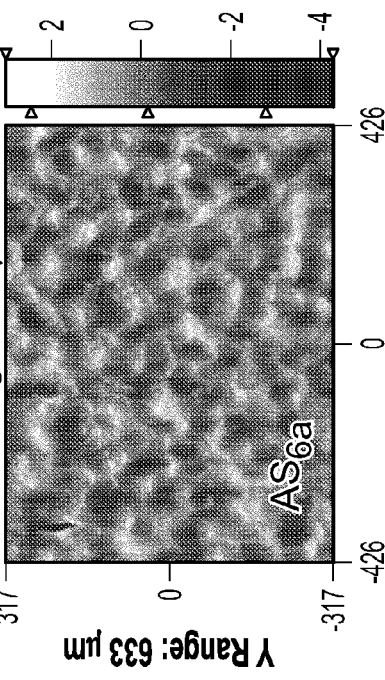
Figure 6D:
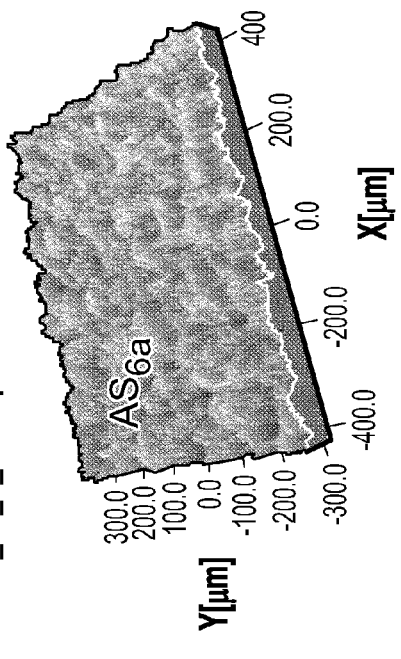
FIGS. 6d, 6e, and 6f are perspective graphical mappings of the surfaces shown in FIGS. 6a, 6b and 6c, respectively, as measured by optical profilometry.
Figure 6C:
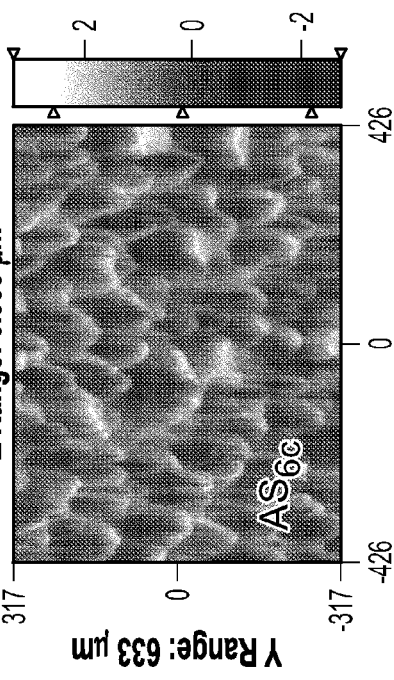
Figure 6F:
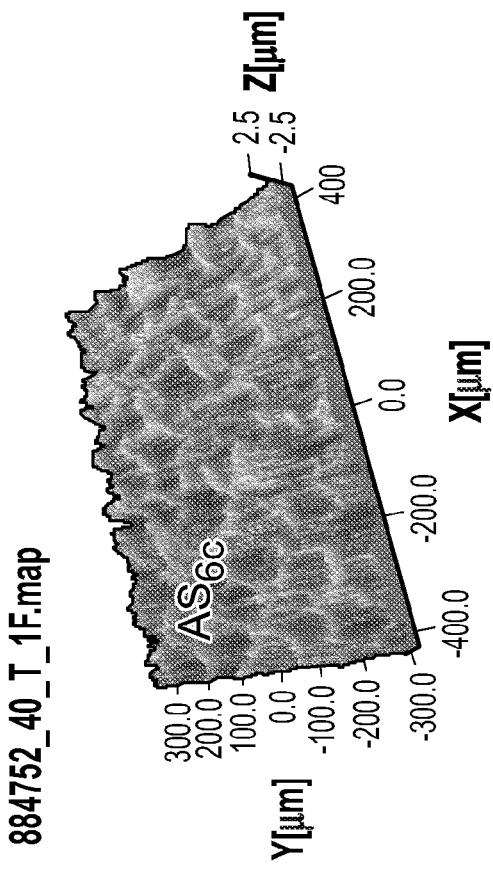
Figure 6E:
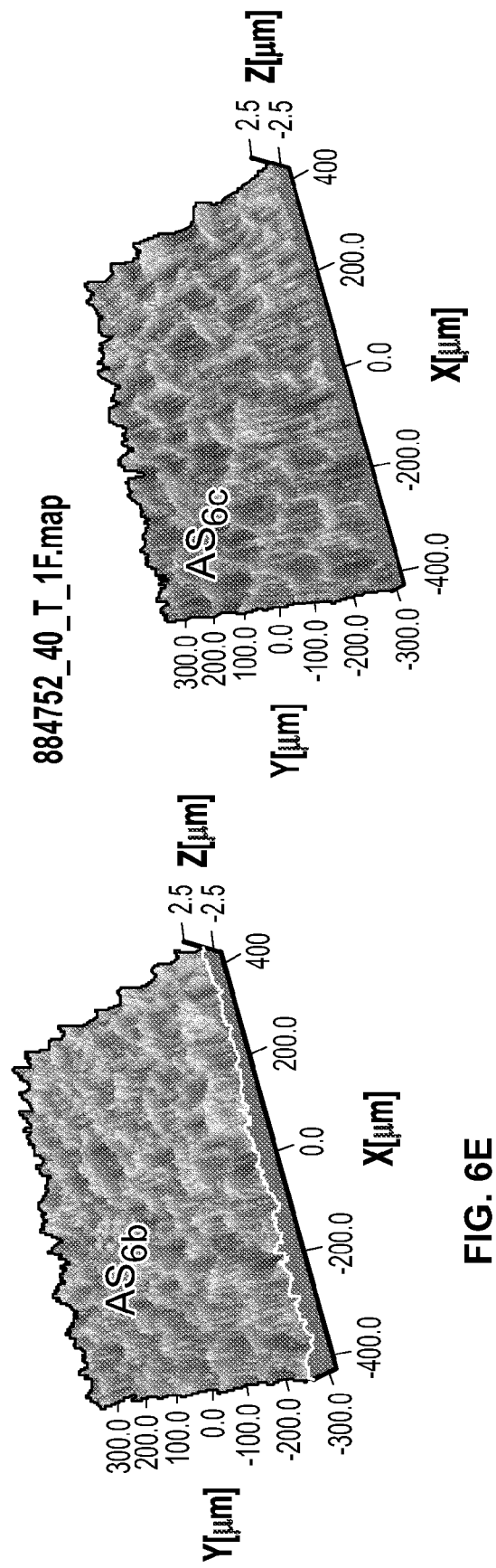

FIGS. 6a, 6b and 6c show plan view graphical mappings of surface morphology of three surface samples $AS_{6a}$, $AS_{6b}$ and $AS_{6c}$ of rolled aluminum sheet in accordance with an embodiment of the present disclosure and rolled by a working roll produced by a process in accordance with an embodiment of the present disclosure at 10% reduction, 20% reduction and 40% reduction, respectively, and as measured by optical profilometry. The working roll used to roll these samples was surfaced by shot-peening with aluminum oxide grit followed by shot-peening with glass beads, as described above relative to FIGS. 4a and 4b. FIGS. 6d, 6e, and 6f are perspective graphical mappings of the surfaces shown in FIGS. 6a, 6b and 6c, respectively, as measured by optical profilometry.

Figure 7B:
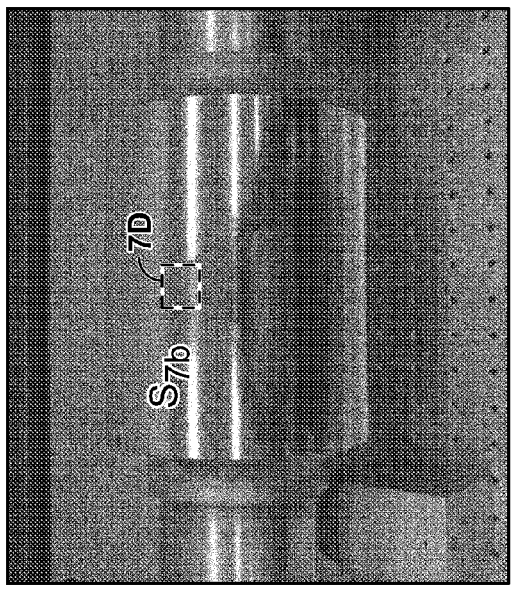
FIGS. 7a and 7b are photographs of working rolls that have been surfaced in accordance with an embodiment of the present invention and FIGS. 7c and 7d are enlarged photographs of fragments of FIGS. 7a and 7b, respectively.
Figure 7D:
Figure 7A:
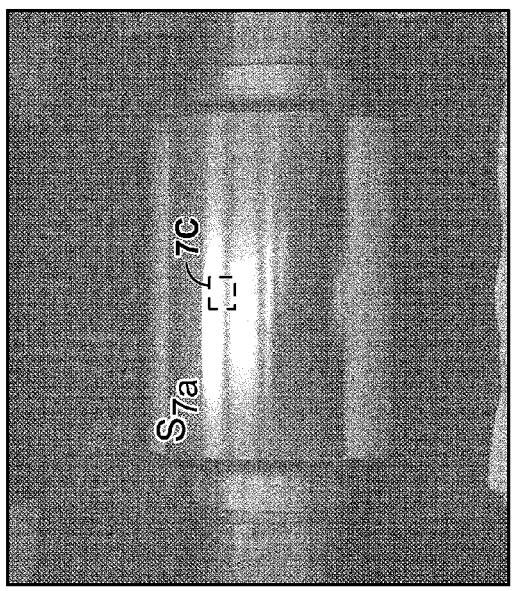
Figure 7C:
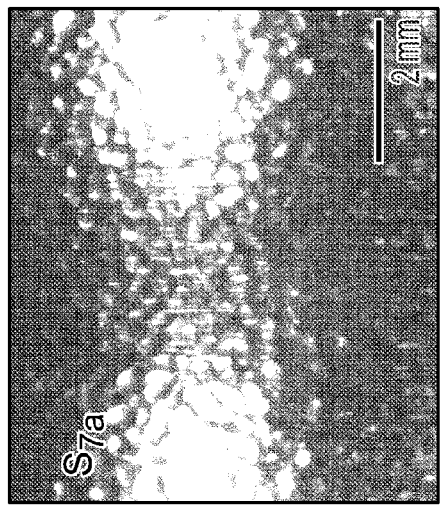

FIGS. 7a and 7b are photographs of working rolls that have been surfaced in accordance with an embodiment of the present invention. FIGS. 7c and 7d are enlarged photographs of fragments of FIGS. 7a and 7b, respectively. The roll shown in FIGS. 7a and 7c were shot-peened with class 1000 steel ball bearings of 1.6 mm in diameter. The roll was shot-peened under conditions that produced 100% coverage of the surface $S_{7a}$ of the roll with dimples/indentations. The roll shown in FIGS. 7b and 7d were shot-peened with class 1000 steel ball bearings of 2.36 mm in diameter. The roll was shot-peened under conditions that produced 50% coverage of the surface $S_{7b}$ of the roll with dimples.

In accordance with an embodiment of the present disclosure, sheet can be produced through normal rolling production schedules, eliminating the need to emboss or use a temper pass on the rolling mill. The resultant work roll surface textures do not wear as fast as EDT produced and normal ground roll surfaces. As a result, roll life exceeds 5 to 6 times that of normal rolls. On a work roll-driven mill, production is not limited to wide-to-narrow production schedules since the texture does not develop banding due to wear. As noted above, the sheet produced by a work roll surface shot-peened with, e.g., ball bearings, generates less debris than an EDT surfaced or normal ground surface, resulting in cleaner lubricant and sheet during rolling. The resultant sheet is isotropic in appearance.

Figure 8:
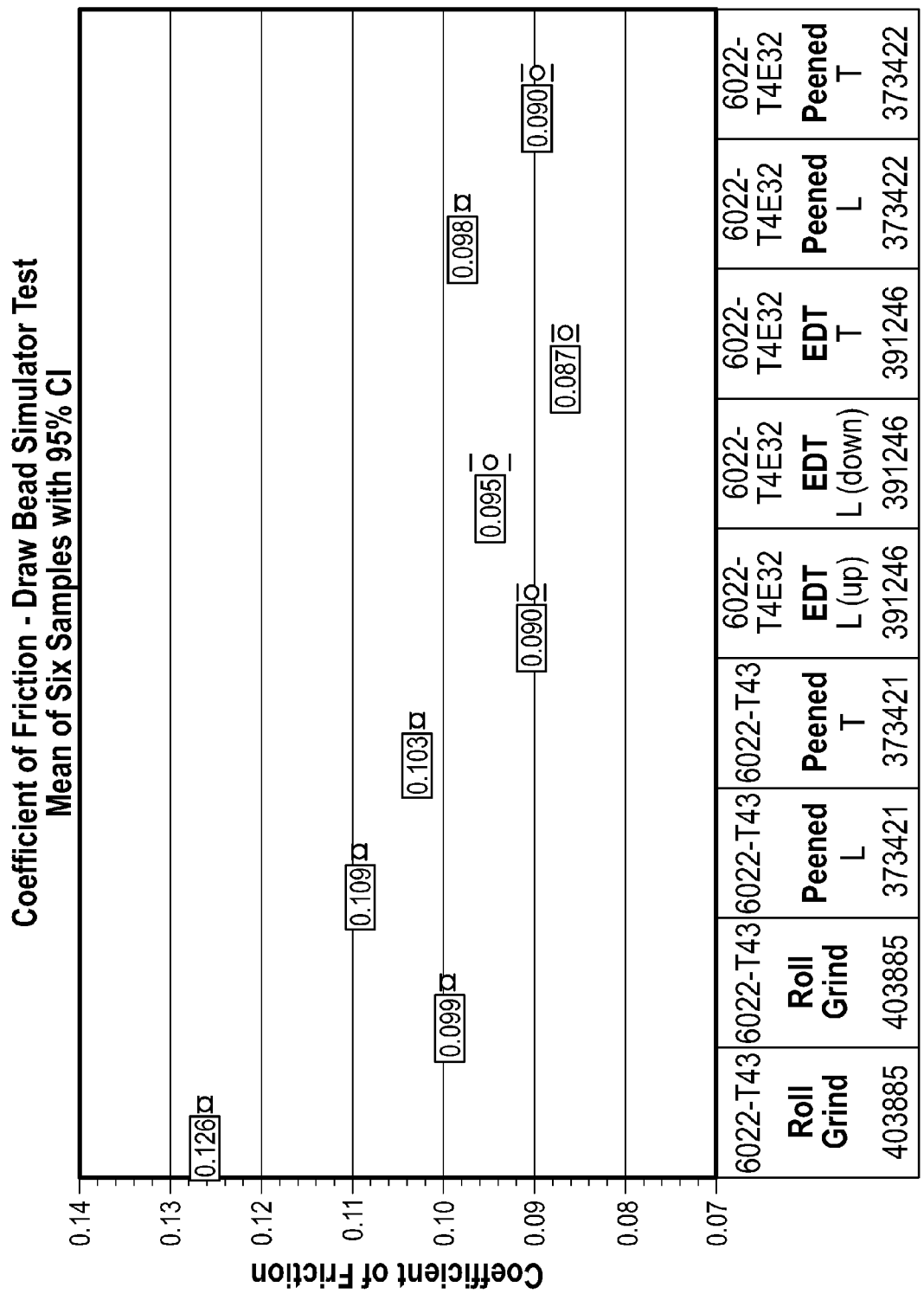
FIG. 8 is a graph of the influence of surface texture on the coefficient of friction.

FIG. 8 shows the directionally dependent coefficient of friction during a forming operation of various surfaces when forming is performed in longitudinal (L) and transverse (T) directions. As to the sample 6022-T43, the peened surface showed a reduction in friction on average and a smaller variation in friction dependent upon the direction of forming. Isotropic frictional interaction with forming tools, such as those used in drawing and ironing may represent an improvement in forming performance, e.g., producing more uniform drawing and extended drawing limits.

In accordance with the present disclosure, the initial surface finish requirements for the work roll before peening, e.g., with ball bearings, depends on the final sheet appearance requirement, e.g., highly specular or somewhat specular. The background roughness is preferred to be <1 μin if a highly specular isotropic surface is desired. If a less specular surface is required, the initial work roll grind can be any desired grind up to 50 μin. The amount of pre-grind desired impacts the final cost of the entire process since it is generally more expensive to produce a surface finish <1 μin roughness. The initial surface finish requirements for the work roll before peening with glass beads or other media to produce a diffuse surface is preferred to be <15 μin or a roughness such that the roll grind pattern is not visible on the peened work roll after processing. The removal of the background roll grind during glass bead peening will be dependent upon the peening processing parameters chosen to produce the diffuse finish. The present disclosure is further illustrated by the following examples.

Example 1

FIGS. 3a-d, 7a and 7c show images of an exemplary surface $S_3$, $S_{7a}$ of a working roll made in accordance with an exemplary embodiment of the present disclosure. To generate the surface shown, a background roll topography is created with standard grinding processes (pre-grind) of about <5 μin roughness. A series of dimples ranging in diameter from 200 to 300 μm are produced on the roll surface by shot-peening with class 1000 steel balls of 1.6 mm in diameter and hardness Rc≥60. The balls are propelled against the surface of a roll having a hardness of about 58 to 62 Rc, at a velocity causing a dimple diameter of about 200 μm to 400 μm and a dimple depth of about 0.5 μm to about 4 μm. Dimple diameter and depth are affected by processing conditions (ball velocity) and are dependent upon the initial work roll hardness. In this example, about 100% of the surface area is covered by dimples, as measured by visual inspection, but coverage can range from about 10% to about 250%, depending upon the desired surface appearance finish. A coverage of 60% to 100% provides a work roll surface that produces aluminum sheets with desirable optical and mechanical properties. The % coverage measured can vary depending upon the method of measuring. Optical methods tend to over-estimate coverage when compared to physical measurement from topographical images.

In accordance with another embodiment, the velocity of the balls may be adjusted to yield indentations having a diameter of 150 μm to 400 μm and a depth relative to the apex of the peripheral lip in the range of 6±2 μm.

The benefits experienced with use of these rolls in breakdown rolling include: pass elimination (1 pass eliminated in cold rolling, 3 passes eliminated in hot rolling); the ability to roll narrow to wide; increased roll life; less roll coating developed in hot rolling due to reduced material transfer; and reduced debris generation in cold rolling.

Example 2

In accordance with another exemplary embodiment of the present disclosure, a diffuse surface work roll may be made by peening a working roll that is pre-ground at <5 microinch roughness The media may be glass bead, other "ceramic" beads of grade A to AH which are mesh sizes 20-30 to 170-325 or other hard abrasive particles, such as aluminum oxide (grit sizes to 12 to 400). A combination of glass beads, ceramic beads and aluminum oxide media, applied in succession, may be required to produce a surface finish like that shown in FIGS. 4a and 4b. For example, the roll surface is first processed with aluminum oxide of mixed grit sizes (2:3 ratio of 120 and 180 grits) with a 5/16" nozzle and 65 PSI at a traverse speed of 1.5" per minute followed by glass beads grade AC (mesh size 60-120) at 100 PSI using a 3/8" nozzle and traverse speed of 1.5" per minute. The standoff distance was adjusted based on the nozzle bristle lengths of the particular peening system. Choices of nozzles, pressures and traverse speeds would be dependent upon the apparatus used to peen. The percent area of coverage can range from 10% to 250% depending upon the desired surface finish.

A working roll surfaced in accordance with the above parameters may be operated at reductions between 10 to 60% (in contrast to EDT treated rolls which are typically operated at reduction of about 8% to 10%). The higher level of reduction may be utilized to eliminate one or more reduction passes that might otherwise be required to achieve a desired thickness and surface appearance. The resultant sheet has an isotropic appearance and isotropic functionality.

Figure 9:
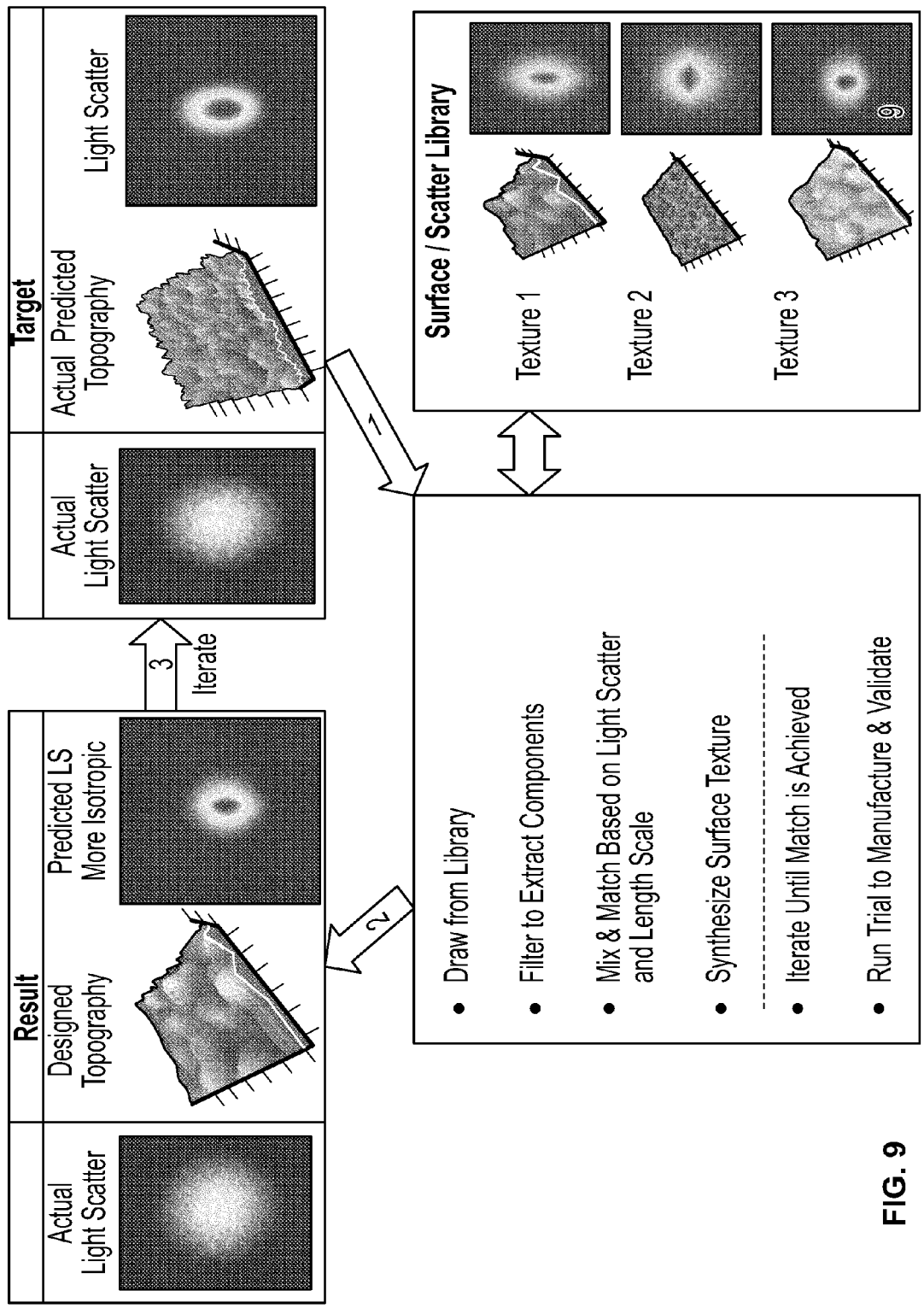
FIG. 9 is a schematic diagram of a process for developing a surface texture in accordance with an exemplary embodiment of the present disclosure.

FIG. 9 shows a diagram of a process for developing a surface texture in accordance with an exemplary embodiment of the present disclosure. In a first stage (I) (not shown), the surface topologies that are obtained by using a range of peening conditions and media types are predicted. For a work roll surface treated by shot-peening, the media size, composition and peening process conditions, such as velocity and % coverage, may be selected to control the desired final texture of the roll, which is then imparted to the rolled product. The relationships between these variables (media size, composition and peening process conditions)

and the surfacing results obtained may be recorded and used as a basis for predictive computer modeling at stage I for any given set of parameters to produce the roll surface texture.

In the next stage (II) (shown in FIG. 9), the light scatter and appearance for a given set of real or hypothesized surface topographies are predicted. As shown in FIG. 9, modeling may include selecting a "target" surface which has specific optical properties, such as predicted light scatter, e.g., to yield a given degree of brightness. A method for generating aluminum sheet having the desired optical properties may then be pursued by the following steps.

(A) accumulating a data file which associates a plurality of given surface profiles with corresponding optical properties of each surface profile, including light scatter, length scale and surfacing treatment parameters utilized to realize each of the plurality of surfaces; (B) implicitly prescribing a virtual surface by specifying target optical properties; (C) modeling the virtual surface by retrieving data pertaining to at least one surface profile with the most similar measured or predicted optical properties as the target optical properties; (D) comparing the target optical properties to the optical properties of the at least one surface profile; (E) in the event that the comparison in step (D) does not indicate identity, then retrieving data pertaining to another surface profile in the data file that has measured or predicted optical properties that are similar to the target properties but are at variance to the target properties in an opposite respect relative to how the optical properties of the at least one given surface profile differ from the target properties; (F) sampling from the optical properties of the at least one surface profile and from another surface profile in proportion to the magnitude of their respective differences from the target properties to arrive at corrected optical properties of a corrected virtual surface and recording the composited sampled composition contributions of the at least one surface profile and the other surface profile; (G) comparing the optical properties of the corrected virtual surface to the target optical properties to ascertain the reduction in the differences therebetween; and then repeating the steps (E)-(G) until little or no improvement is discerned, whereupon the best virtual surface relative to the target has been ascertained.

Note that steps (C) through (G) can be executed as described or can be replaced by a non-linear least squares optimization algorithm to automate the process. To complete the process, the Modeling steps (I) and (II) are combined. Namely, by: (1) ascertaining the surfacing treatment parameters utilized to realize each of the plurality of surfaces by compositing such parameters in proportion to the contribution of optical properties of each surface profile composited in the best virtual surface thereby defining best surfacing treatment parameters; (2) conducting surfacing of a roll in accordance with the best surfacing treatment parameters; and (3) rolling the aluminum sheet with the roll surfaced at step (I). As can be seen, upon reaching a modeled solution, the shot-peening parameters associated there with may be implemented in surfacing a work roll. The actual results of implementation may be stored in the database along with the process parameters that caused them to expand the modeling capability.

Figure 10:
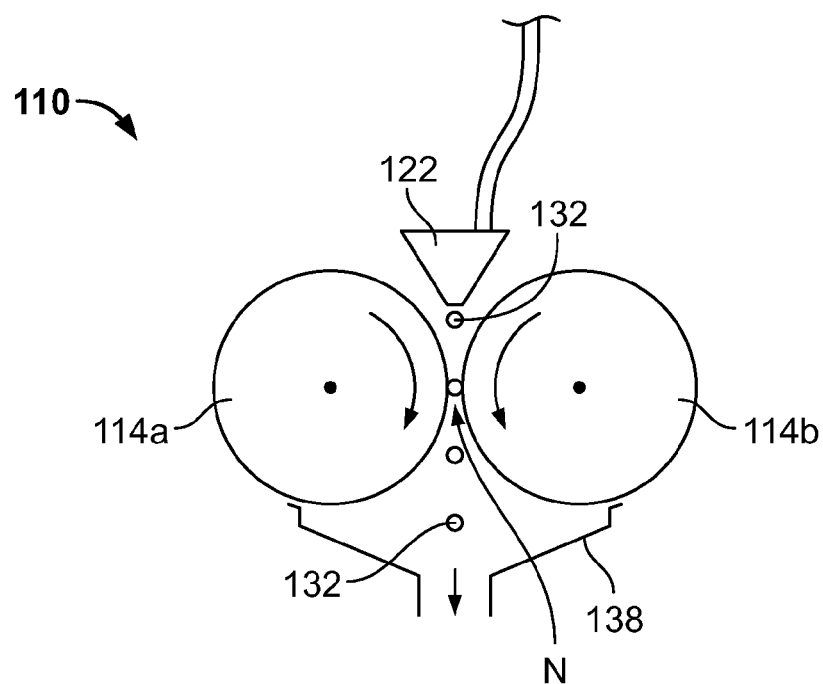
FIG. 10 is a diagrammatic view of an apparatus for surfacing a work roll in accordance with another embodiment of the present disclosure.

FIG. 10 shows an alternative apparatus 110 for surfacing work rolls 114a, 114b in accordance with another embodiment of the present disclosure. During the surfacing process to be described below, the work rolls 114a, 114b are arranged in parallel and are rotatable relative to each other, being supported on the ends by suitable bearings (not shown), like 16, 18 of FIG. 2 and driven by a motor or motors (not shown) like motor 20 shown in FIG. 2. A media nozzle 122 like nozzle 22 of FIG. 2 may be retained on a gantry for moving or positioning the nozzle 122 along the length of the rolls 114a, 114b proximate to where they converge, which may be called a nip N. The nozzle 122 can dispense media, e.g., ball bearings 132 into the nip area N, such that when the rolls 114a, 114b are turned in the directions shown by the arrows, the balls 132 will be drawn between the rolls. Unlike nozzle 22, the nozzle 122 need not propel the balls 132 under pressure to achieve a high velocity, but may merely dispense the balls 132 in a controlled manner. If the space between the rolls 114a, 114b is smaller than the diameter of the balls 132, then a state of mechanical interference is achieved when they are drawn into the nip N. Given that the balls 132 are of comparable or greater hardness than the surface of the rolls 114a, 114b and are sufficiently elastic, having an adequate compression strength to pass through the nip N without breaking, they will induce the formation of craters in the surface of the rolls 114a, 114b as they pass through the nip N. The craters are formed in the surface of the rolls 114a, 114b by compression rather than from the force of impact of balls projected at the surface at high velocity. After passing through the nip N, the balls 132 may be collected in a gutter or hopper 138 for re-use. The rolls 114a, 114b may be adjustable to allow them to be moved closer together or farther apart, narrowing or widening the nip N, to adjust to different size balls 132 and/or to control the depth of the craters that are formed on the rolls 114a, 114b.

Figure 11:
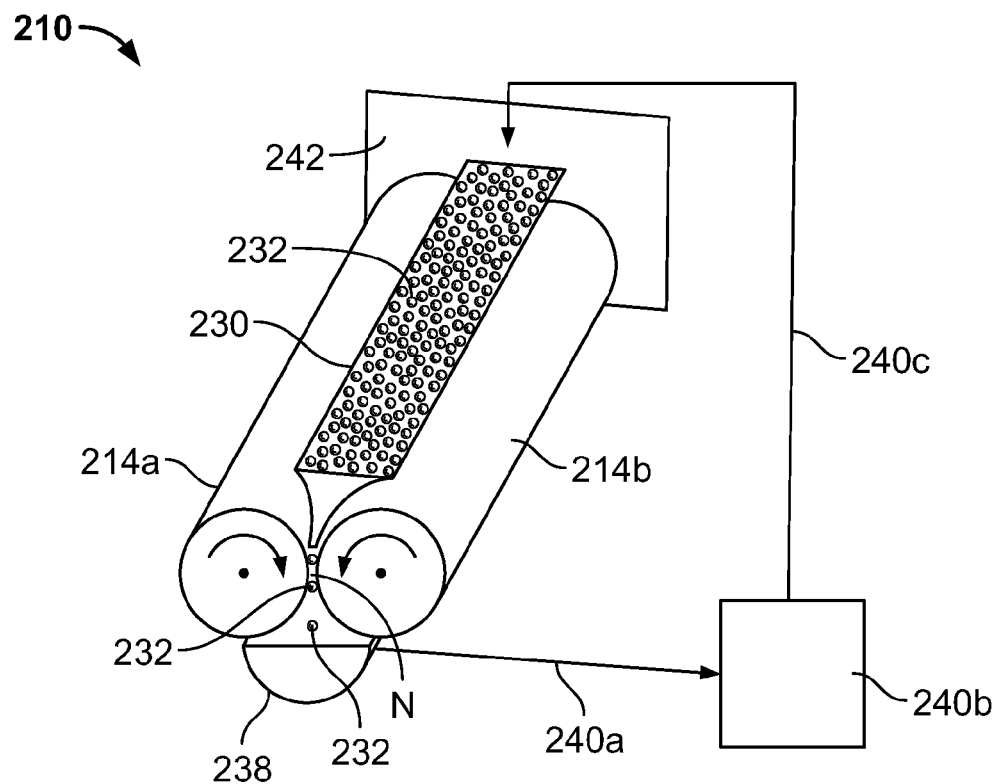
FIG. 11 is a diagrammatic view of an apparatus for surfacing a work roll in accordance with another embodiment of the present disclosure.

FIG. 11 shows a similar apparatus as FIG. 10 with another type of ball feeding mechanism, viz., an elongated hopper/funnel 230, which is capable of holding and dispensing a supply of balls 232, such that the area between the nip N and the hopper/funnel 230 is filled to capacity with balls 132 at all times. More particularly, balls 232 passing through the nip act as a stopper line causing balls falling through the hopper funnel 230 to back up and prevent more balls from falling out. The funnel/hopper 230 may be closely fitted to the generally V-shaped area defined by the rolls 214a, 214b above the nip N, such that balls 232 can not pass between the rolls 214a, 214b and the funnel/hopper 230. As balls 232 pass through the nip N, more balls flow out of the hopper/funnel 230 to replace them, The used balls 232 are collected in gutter 238 and recycled via lines 240a, 240c and recycling apparatus 240b. A barrier 242 on either end of the rolls 214a, 214b (only one shown) can be used to prevent the balls 232 from flowing over the ends of the rolls 214a, 214b, containing the balls 232 in the V-shaped area.

Figure 12:
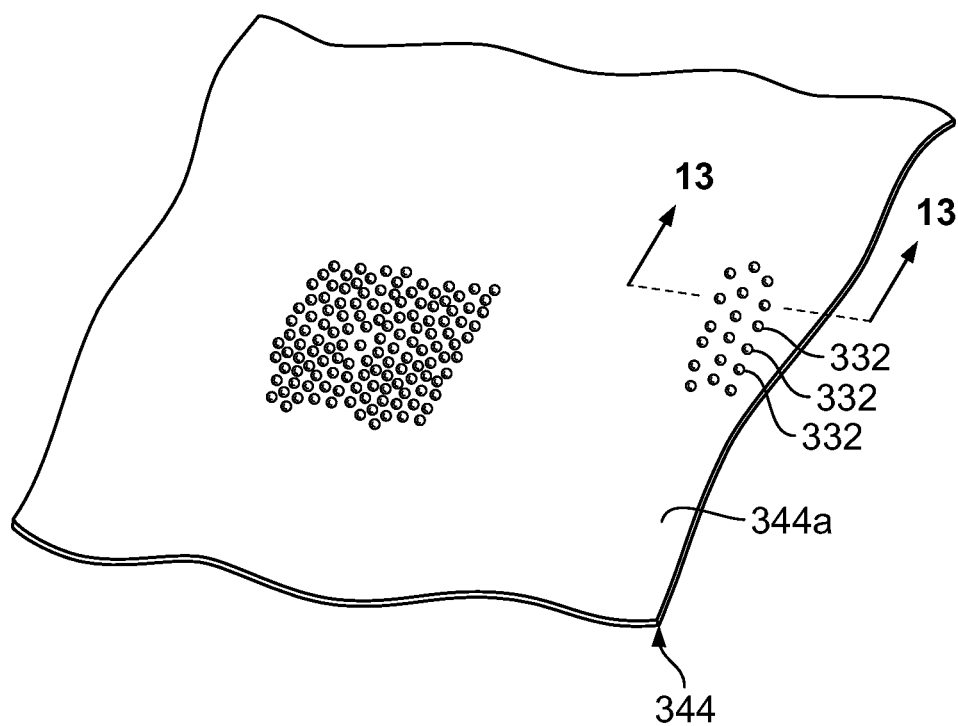
FIGS. 12 and 13 are perspective and cross-sectional views, respectively, of a media sheet for surfacing a work roll in accordance with another embodiment of the present disclosure.
Figure 13:
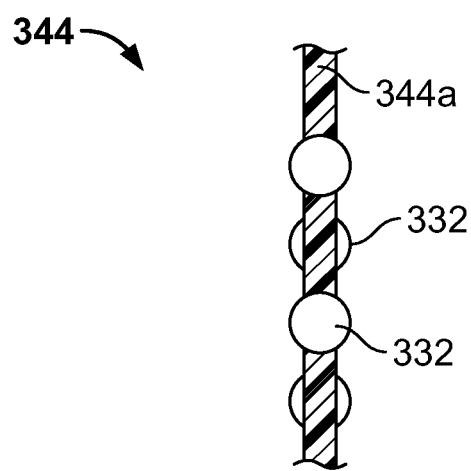

FIGS. 12 and 13 show a media sheet 344 for surfacing a work roll in accordance with another embodiment of the present disclosure. The media sheet 344 may have a web portion 344a, e.g., made from an elastomer, in which surfacing media, such as spherical indentors 332 like ball bearings are embedded. Alternatively, the web portion 344a could be made from a sheet of paper or polymer to which the surfacing media is adhered by glue. The media sheet 344 may be employed with a surfacing apparatus 110, 210 like those shown in FIGS. 10 and 11, namely, by passing the media sheet 344 through the nip N in place of loose balls 132, 232. If the web portion 344a is resilient enough and holds the balls 332 tightly, it may be possible to make a continuous loop with the media sheet 344 allowing it to be cycled between the rolls 214a, 214b until the desired crater coverage is realized. As shown in FIG. 12, the balls 332 may be distributed over the media sheet 344 in any desired pattern, such as a comprehensive, evenly spaced coverage of the entire media sheet 344, a more dispersed pattern or a random distribution.

Figure 14:
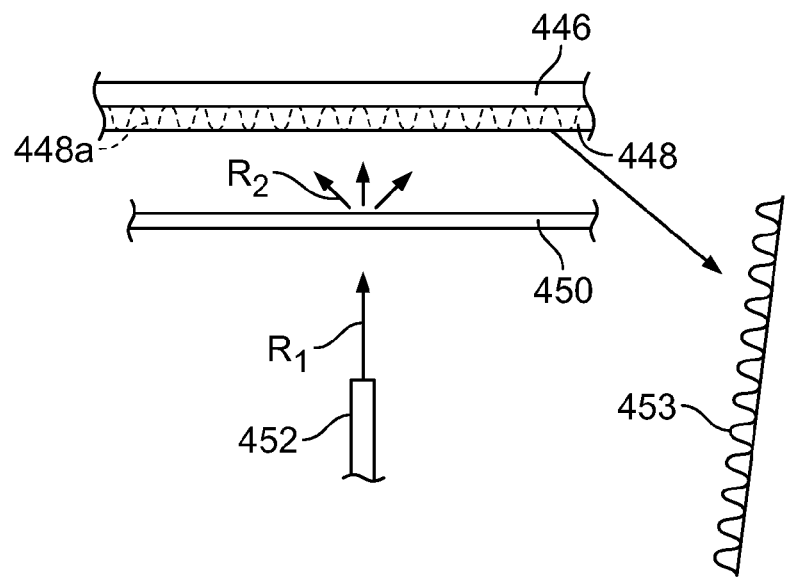
FIG. 14 is a diagrammatic view of an apparatus for generating a shim for surfacing a work roll in accordance with another embodiment of the present disclosure.

FIG. 14 diagrammatically shows a support surface 446, e.g., glass, coated with a layer of photoresist or a photopolymer 448. A source of radiation 452, such as a UV light, an electron beam or a laser, emits radiation, R1. In the case of light, an optional radiation distribution element 450, such as a mask or a lens array, distributes the radiation R1 into a distributed array of radiation R2 that impinges on the photoresist layer 448 creating an undulating pattern 448a of greater and lesser light exposure. Upon development of the photoresist, a surface having a desired smoothly contoured texture may be formed. Alternatively, the layer of photoresist may be exposed/shaped by a laser scanner or electron beam scanner to generate the desired pattern of exposure and resultant surface profile upon development.

As described in U.S. Pat. No. 7,094,502 to Schaefer et al., which is owned by the assignee of the present application and which is incorporated herein in its entirety by reference, a shim 453 may be grown from the surface profile of the developed photoresist layer 448. As further described in U.S. Pat. No. 7,094,502, the shim 453 may be hardened via various plating and coating processes to allow it to impressed upon the surface of a metal roll to allow the surface texture thereof to be transferred to the surface of the roll, and then, subsequently, to a product surface. In accordance with one aspect of the present disclosure, a shim 453 having a smoothly undulating surface profile may be used to impart that texture to a working roll, like roll 114a and or 114b. For example, a shim 453 of this nature could be used like the media sheet 344, passing the shim 453 between rolls 214a, 214b of the apparatus 210 of FIG. 11. In order to surface both rolls 214a, 214b simultaneously, two shims 453 placed back to back or a shim 453 with two textured faces could be employed. As another alternative, a textured shim 453 could be affixed to the surface of a work roll, e.g., 214a by adhering it to the roll via adhesives, brazing or welding and then used to roll aluminum sheet.

Figure 15:
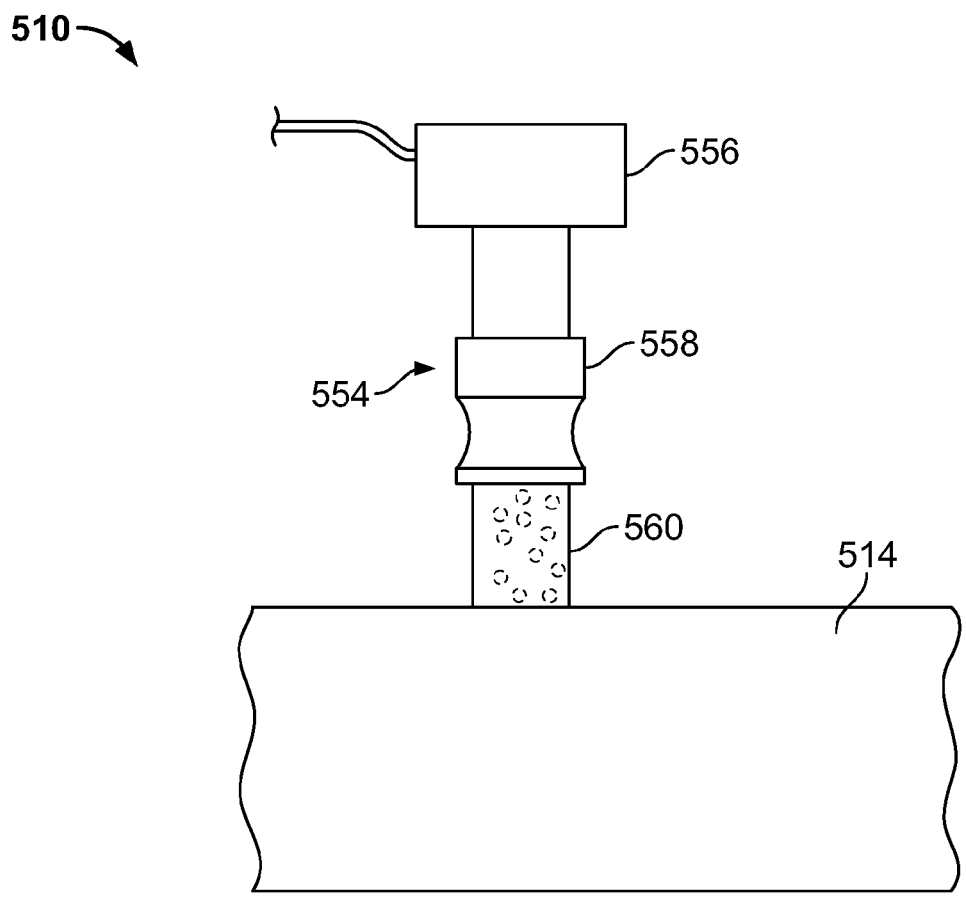
FIG. 15 is a diagrammatic view of an apparatus for surfacing a work roll in accordance with another embodiment of the present disclosure.

FIG. 15 diagrammatically shows an ultrasonic ball peening apparatus 510 for surfacing a work roll 514 in accordance with another embodiment of the present disclosure. Ultrasonic ball peening devices are available commercially, .e.g., from Sonats S A, Nantes, Carquefou, France. In accordance with the present disclosure, such ball peening devices may be applied to the purpose of surfacing working rolls for rolling sheet aluminum, i.e., if the velocity, density, size, elasticity, and compression strength of the balls are such that the appropriate crater depth is realized on the surface of the treated roll without peening media breakage/degradation.

Figure 16:
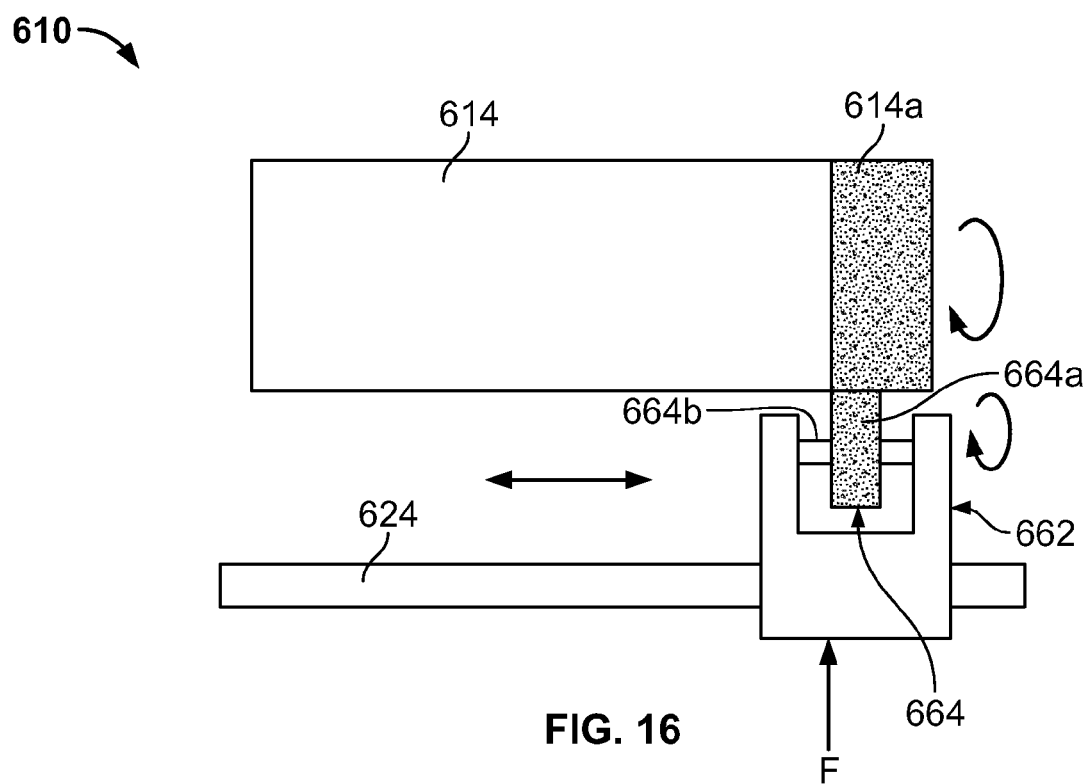
FIG. 16 is a diagrammatic view of an apparatus for surfacing a work roll in accordance with another embodiment of the present disclosure.

FIG. 16 shows an apparatus 610 for surfacing a work roll 614 in accordance with another embodiment of the present disclosure. A knurling head 662 supports a knurling wheel 664 having a textured surface 664a. The knurling wheel 664 is rotatable on an axle 664b and is urged into the surface of the work roll 614 under the influence of a substantial force F. Since the contact area of the knurling wheel 664 and the work roll 614 is very small, the force F is concentrated over a small area, allowing the texture of the surface 664a to be transmitted to the roll 614, as shown by the area 614a. A gantry 624 may be used to allow the knurling head 662 to traverse the work roll 614 to impart the desired texture over the entire roll 614. The work roll 614 may be rotated by an electric motor inducing the knurling wheel 664 to rotate as it textures the work roll 614. An aspect of the present disclosure is to ensure that the resultant surface 614a (or the resultant surfaces of a work roll processed by the apparatus described with reference to FIGS. 10-15) has a conformation consistent with the beneficial texture described above, e.g., that achieved by shot peening with ball bearings, such as described above referring to FIGS. 3a-3d. The texturing of a work roll 614 using the apparatus 610 may require more than one traversal by the knurling head 662, depending upon the density of the surface texture of the surface 664a (undulations per unit area) and the coverage % desired.

Figure 17:
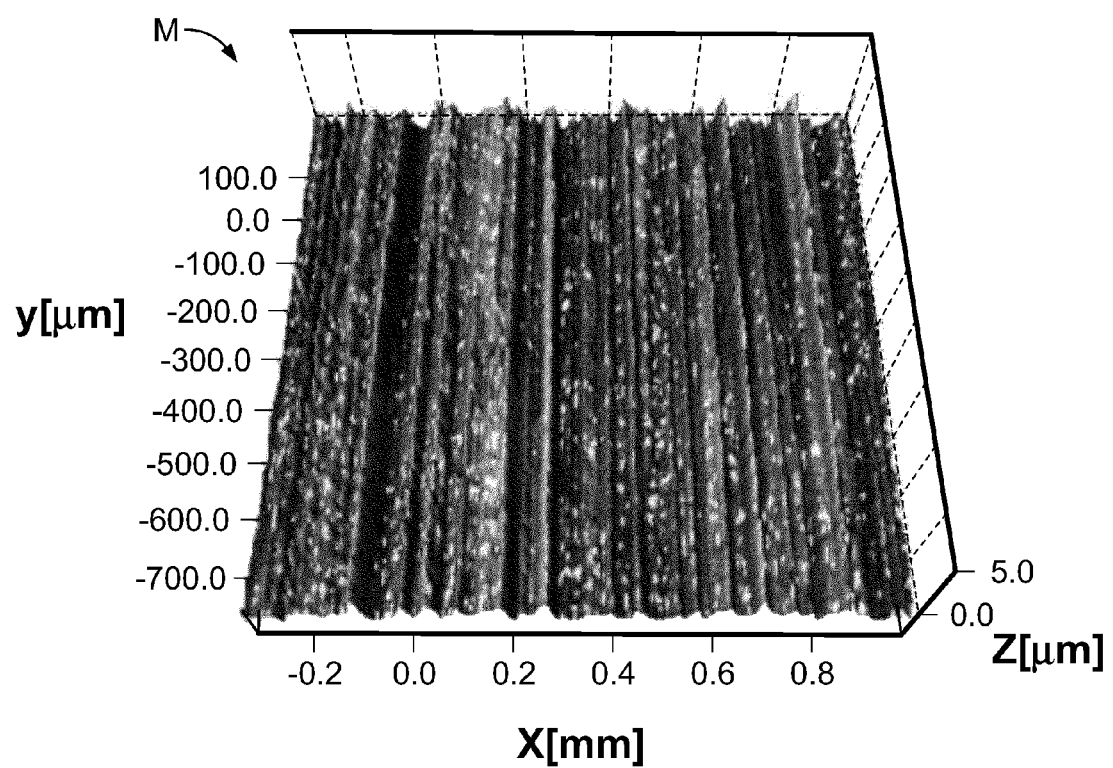
FIG. 17 is a perspective view of a surface texture of a sheet produced by a roll that is ground in a conventional manner.

FIG. 17 shows a surface of aluminum sheet metal M with a surface roughness produced by a roll that is surfaced by grinding. Note that the X axis is expressed in mm and the Y and Z axes in μm. Ground rolls impart the sheet with a pattern having a plurality of elongated, parallel furrows. The surface of the sheet M is rough in all directions and the roughness varies with direction, giving rise to frictional directionality when the sheet interacts with another object or objects. Typically, roll roughness that is transferred to the conventional rolled sheet can be in the range of about 0.5 to 1 μm Ra. An aspect of the present disclosure is the recognition that the roughness and directionality of conventional sheet rolled by ground work rolls has an impact on the functionality of the sheet when used in certain applications. Further, that a sheet produced in accordance with the present disclosure, e.g., produced by a roll that is peened by ball bearings as described above, may be used advantageously relative to a conventional sheet for certain applications. For example, when the sheet is used in a structure for storing and/or directing the flow of materials, like grain, sugar, flour or other finely divided material, a sheet produced in accordance with the present disclosure, can decrease the frictional interaction with the material and reduce frictional variation due to direction, leading to improved flow and greater flexibility in the design of the material handling structure.

Figure 18:
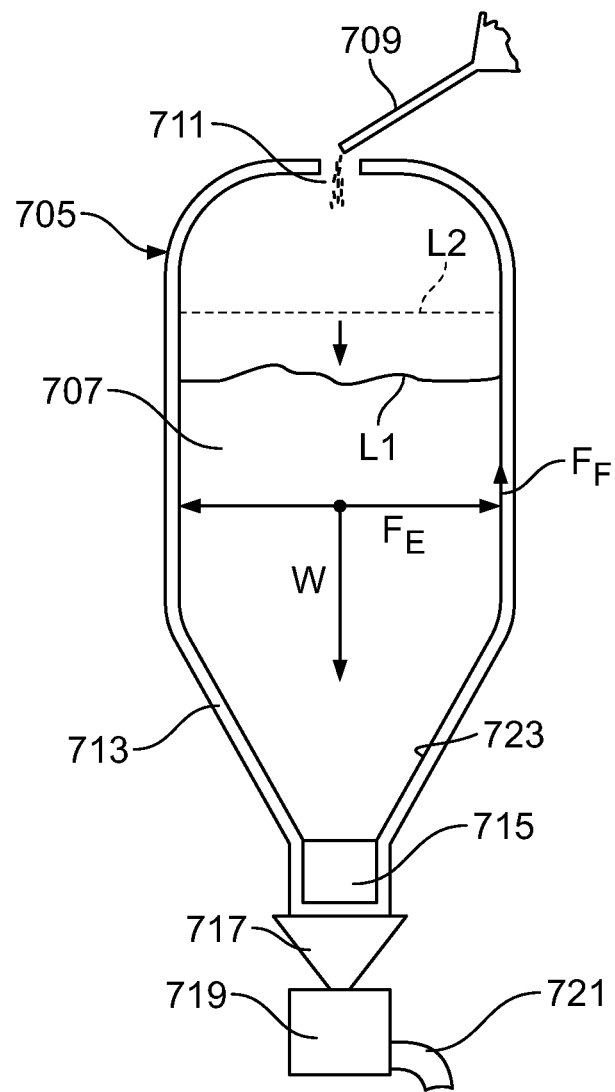
FIG. 18 is a diagrammatic view of a material storage structure in accordance with another embodiment of the present disclosure.

FIG. 18 shows a storage receptacle 705, such as a tank or silo for holding grains, flour, cereal, powdered foods such as, milk, chocolate, spices, eggs, sugar, coffee, tea or other flowable, divided, solid material 707, such as sawdust. The material 707 fills the receptacle 705 to a level L1 and may assume various levels, e.g., L2, within the receptacle 705 as it is dispensed from or fills the receptacle 705. A filler tube 709 is shown positioned proximate a top opening 711 for depositing material 707 into the receptacle 705. The receptacle 705 may have a funnel shaped portion 713 which converges to an outlet 715. The outlet 715 may house a material moving/control device such as a valve, a mechanical turbine, helical dispenser or pneumatic or suction dispenser. Funnels 717, sifters 719 and outlet nozzles 721 of various types may be utilized depending upon the material stored in the receptacle 705. The interior walls 723 of the receptacle 705 may be made from sheet metal, e.g., steel or aluminum. An aspect of the present disclosure is the recognition that aluminum sheeting made by the techniques disclosed herein can be advantageous when used for forming the interior walls of storage receptacles 705. More particularly, the low coefficient of friction associated with the aluminum sheet produced by rolls treated as described herein, e.g., referring to Example 1 above, may promote the infilling and dispensing of material, e.g., flour or sugar from the receptacle 705. Using flour as an example, when introduced into the receptacle 705 (which in this case may be a flour silo) a low static coefficient of friction allows the flour to be shed from the interior surfaces, e.g., 723 and fall to the lowest point of the receptacle that is unoccupied by material 707. A low static coefficient of friction of the interior 723 promotes the self-distribution of material 707 in the receptacle 705. Material 707 present in the receptacle 705 wants to assume the lowest, least energetic position due to gravity (weight W of the material 707), but the weight of the material 707 also causes the material to spread/expand sideways, exerting force $F_E$ against the interior 723 of the receptacle 705. When the material 707 moves relative to the interior surface 723, a frictional force $F_F$ arises, resisting the movement of the material 707. For example, if the material 707 is dispensed from the receptacle 705, causing it to move from level L2 to level L1, the surface area of the material 707 in contact with the interior surface 723 would exert a frictional force $F_F$ along the area of contact, impeding the movement of the material 707 and its dispensing from the receptacle 705. The frictional force $F_F$ is more significant in the funnel portion 713, in that a smaller component of the weight W is directed parallel to the interior surface 723 to oppose the friction force $F_F$. By using the aluminum sheeting material of the present disclosure to form the interior surface 723, the static coefficient of friction is reduced relative to sheeting material having a conventional surface (like FIG. 17) facilitating filling and dispensing material from the receptacle 705. The static coefficient of friction for a material depends upon the roughness of the material, which for a conventional sheet would typically be 0.5 to 1.0 μm. A comparable sheet material produced by rolls surfaced in accordance with the present disclosure, e.g., indenting with ball bearings, etc., as described above, will exhibit reduced surface roughness and a 10 to 30% improvement in static friction coefficient. This improvement translates into a workable orientation (slope) for a guide/storage surface encountering a material such as flour of about 40 to 70 degrees relative to the horizontal, e.g., for the funnel portion 713.

Reducing the static coefficient of friction reduces the energy generated due to friction when handling bulk materials like flour, lowering the risk due to dust explosion. Further, reducing the coefficient of friction of the interior 723 of the receptacle with the material 707 may, by promoting infilling and dispensing, reduce the need for material moving equipment (paddles, blowers, screw drives, etc.) and the energy to power them. In addition, a greater capability to shed material 707 may promote the cleanliness of the interior surface 723 and first-in, first-out material dispensing. In the case of flour and other food materials 707, first-in, first-out turnover prevents material from persisting in the receptacle for an undesirably long period, causing spoilage. Flour will go rancid if it sticks to the interior surfaces 723 of the receptacle 705 and persists there for an excessive amount of time. An interior 723, which sheds the stored material allows it to fall to the bottom for earlier dispensing. In addition, this shedding may also lengthen the time between required cleaning of the receptacle, which in the case of a large storage receptacle like a flour silo, entails considerable expense and inconvenience.

Figure 19:
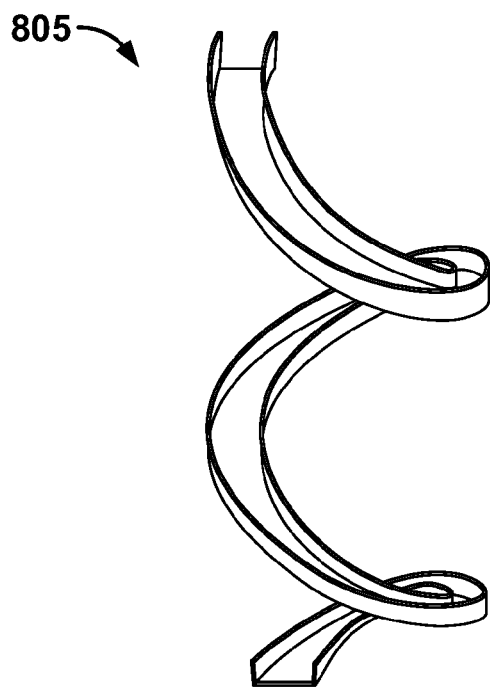
FIG. 19 is a diagrammatic view of a material handling structure in accordance with another embodiment of the present disclosure.

In addition to storage structures, the attributes of low static friction coefficient sheeting material made in accordance with the present disclosure may also be used advantageously for fabricating material moving structures. FIG. 19 shows a trough 805 having a compound helical shape and formed from sheet metal, e.g., aluminum alloy treated by rolls described in the present disclosure. Since the surfaces of the trough 805 have a lower static coefficient of friction, it will pass materials, e.g., grains, flour, sugar, objects, etc. more easily than a similarly shaped trough made from a material having a higher static coefficient of friction. As a result, the trough 805 may use a lower slope and may be made in smaller dimensions than a comparable trough made from sheeting with a larger static coefficient of friction. While the trough 805 suggests gravity conveyance, sheeting with a low coefficient of friction it would also promote movement there over that is induced by a moving device, such as a pusher, paddle or other automated device.

Figure 20:
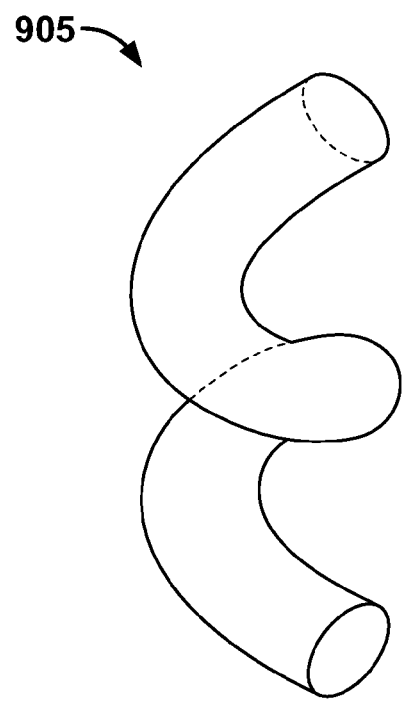
FIG. 20 is a diagrammatic view of a material handling structure in accordance with another embodiment of the present disclosure.

FIG. 20 shows a tube or duct 905 having a compound helical shape and formed from sheet metal, e.g., aluminum alloy treated by rolls described in the present disclosure. Since the trough 805 has a low static coefficient of friction, it will pass materials there through more easily than a similarly shaped trough made from a material having a higher static coefficient of friction, thereby relaxing design constraints imposed by sheeting having a greater static coefficient of friction. The material conveying structure need not have a compound shape and can be an inclined flat surface, a straight tube or other simple shape and still exhibit the benefits of a lower static coefficient of friction.

Figure 21:
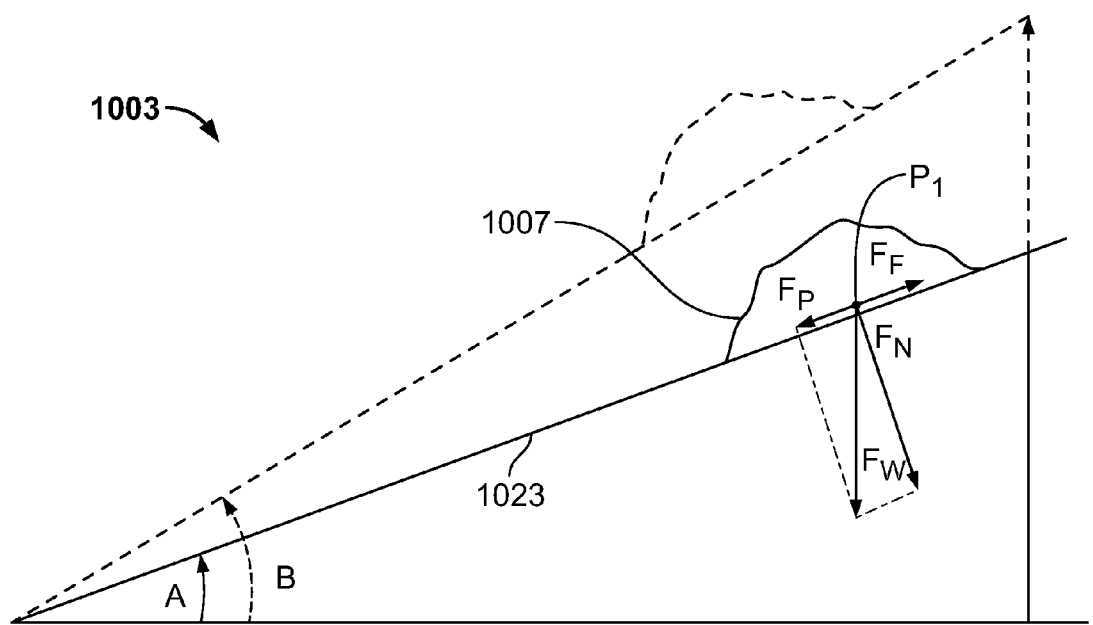
FIG. 21 is a diagrammatic view of a coefficient of friction test apparatus.

FIG. 21 shows a testing apparatus 1003 for testing the static coefficient of friction $\mu_s$ of a sample sheet 1023 relative to a given material 1007, such as flour. For simplicity of illustration, the sample of material 1007 is assumed to have a weight emanating from a single point generating gravitational (weight) force $F_W$. $F_W$ can be resolved into a force normal to the surface of the sheet 1023 $F_N$ and a force parallel to the sheet 1023 $F_P$, which is opposed by the friction force $F_F$. The friction force $F_F$ is related to the normal force $F_N$ by the static coefficient of friction as expressed in the equation $F_F = \mu_s F_N$. When the parallel force $F_P$ exceeds the friction force $F_F$, the material 1007 will slide down the inclined surface of sheet 1023. As shown by angles A and B, the sheet 1023 can be positioned at selected angles relative to the horizontal to ascertain the angle at which the material 1007 will slide. As described in the following examples, an aluminum sheet formed in accordance with the present disclosure exhibits a lower static coefficient of friction than conventional sheeting and therefore material 1007 that is placed on the surface of the sheet 1023 slides at lower angles relative to the horizontal (at a lesser slope) than comparable conventional sheet material.

Example 1

A sheet of aluminum alloy 60 cm by 30 cm produced by a ground roll having 0.78 m roughness having conventional directionality and a static coefficient of friction of 0.88 relative to flour when tested parallel to the grain direction and a static coefficient of friction of 0.92, when tested perpendicular to the grain direction, was placed on a surface in a horizontal position. A similarly dimensioned sheet of aluminum alloy formed in accordance with the present disclosure (surfaced by a roll having been peened by ball bearings in accordance with the process outlined above in Example 1) and with a static coefficient of friction of 0.72 relative to flour when tested in a first direction and a static coefficient of friction of 0.73 when tested in a second direction perpendicular to the first direction, was placed beside the first sheet. A cup of flour, weighing 25 g was poured onto the surface of each sheet at about the same position. The sheets were then inclined at increasing angles relative to the horizontal. The flour disposed on the sheet in accordance with the present disclosure was observed to slide down the sheet at an angle of 46°. The flour disposed on the conventional sheet did not slide down the sheet until the angle of elevation reached 61°. The conventional sheet was positioned with the grain direction parallel to the motion of the flour.

Example 2

In a second example, both the conventional sheet from the first example and the sheet made in accordance with the present disclosure were reused with the same amount and type of flour as before, but both were reoriented at 90 degrees relative to their original position (such that the grain direction of the conventional sheet was oriented side-to-side when tilted). The experiment was repeated. The flour slid down the sheet in accordance with the present disclosure when the sheet reached an angle of 47°, whereas the flour on the conventional sheet slid at an angle of 67°.

The foregoing examples illustrate that aluminum sheeting made in accordance with the present disclosure has a lower static coefficient of friction than conventional sheeting and that the coefficient is less dependent upon the orientation of the sheet. In addition, the interaction of the sheet with a lower coefficient of friction with flour allows the flour to slide at a less severe angle than the conventional sheet. This difference in sliding ease can be beneficially used in structures used to direct, move and store materials, such as grains, flour, sugar, salt, powdered or granulated chemicals, such as sodium bicarbonate, sawdust or any other such materials. Reduced frictional interaction may be employed to increase the flow rate of materials through chute, tubes, funnels, pipes and other hollow structures thereby speeding material transfer, eliminating or reducing the energy requirements of machinery such as blowers and paddles to move such materials along, decreasing material handling apparatus complexity, fabrication and maintenance costs and energy use. Increased rates of material transfer reduce the time and cost to conduct transfer. For example, with respect to filling a silo with grain, flour or sugar from a cargo vehicle, an improved rate of transfer of 10% will translate into a 10% reduction in the time required of the vehicle, crew, warehousemen, etc., all of which amount to significant cost savings. An increased rate of transfer and decreased friction also allows more efficient filling of a receptacle like a silo, in that particulate matter like flour or grains can more easily slide along the interior surfaces of the silo as additional material is introduced. This sliding accommodates the added material, allowing it to spread and not to concentrate in areas, e.g., under the fill conduit, that would otherwise lead to areas of low density packing and high density packing of the material. Decreased frictional interaction between materials and material moving and storing structures also translates into greater design freedom of such structures, e.g., reducing the slopes needed to keep a given material flowing through the material handling structure. The same can be said of the isotropic nature of the friction coefficient of the sheeting produced in accordance with the present disclosure, in that the isotropic quality allows material handling structures to be fabricated without concern for orientation of sheeting grain. Besides insuring a reduced frictional interaction without regard to grain direction, the isotropic quality also allows material movement to be predicted more readily. For example a material pathway can be ascertained based upon geometry and static and dynamic forces independent of the grain direction of the sheeting used to fabricate the structure.

It will be understood that the embodiments described herein are merely exemplary and that a person skilled in the art may make many variations and modifications without departing from the spirit and scope of the claimed subject matter. For example, some disclosure above indicated that the range of roughness (roll grind) that are typically applied to aluminum rolling operations covering hot and cold rolling applications span <1 μin to 50 μin and that typical work roll hardness for A1 operations is 50 to 70 Rc. Notwithstanding, the methods and apparatus of the present disclosure could be applied to any surface finish above 50 μin and any roll hardness to achieve the same results by adjusting the peening media and peening parameters, such as pressure and dwell time to affect % coverage. All such variations and modifications are intended to be included within the scope of the present disclosure.

We claim:

1. A method for making a material handler with at least one material contacting surface, comprising the steps of:
   obtaining aluminum sheet that has been rolled by a work roll having a surface 50% to 100% covered by indentations lacking facets and having a depressed central area relative to a mean height of the surface and a raised, smooth peripheral lip having a greater height at an apex thereof than the mean height of the surface, the aluminum sheet having a static coefficient of friction with the at least one material of between 0.62 and 0.79;
   forming the aluminum sheet into the at least one material contacting surface.

2. The method of claim 1, wherein the indentations have a diameter in the range of 150 μm to 400 μm and a depth relative to the apex of the peripheral lip in the range of 6 ±2.0 μm.

3. The method of claim 2, wherein the material handler is a silo with an interior space for storing the material and the material contacting surface forms at least a portion of a surface defining the interior space.

4. The method of claim 2, wherein the material contacting surface is formed into a funnel portion of the silo.

5. The method of claim 3, wherein the material handled by the silo is flour and further comprising the step of introducing the flour into the silo and contacting the material contacting surface with the flour.

6. The method of claim 3, wherein the material handled by the silo is sugar and further comprising the step of introducing the sugar into the silo and contacting the material contacting surface with the sugar.

7. The method of claim 2, wherein the material handler is a funnel with an interior space for converging the material toward an outlet and the material contacting surface forms at least a portion of a surface defining the interior space.

8. The method of claim 2, wherein the material handler is a trough with an interior space for guiding the material and the material contacting surface forms at least a portion of a surface defining the interior space.

9. The method of claim 2, wherein the material handler is a conduit with an interior space for guiding the material and the material contacting surface forms at least a portion of a surface defining the interior space.

10. The method of claim 2, wherein the aluminum sheet has a static coefficient of friction differing by no more than 5% between any two given orientations of the sheet relative to the direction that the coefficient is measured.

* * * * *